US005482402A

United States Patent [19]
Nelson

[11] Patent Number: 5,482,402
[45] Date of Patent: Jan. 9, 1996

[54] METHOD AND APPARATUS FOR HEATING SUBSURFACE SOIL FOR DECONTAMINATION

[75] Inventor: Joseph M. Nelson, Wilmington, Del.

[73] Assignee: Hrubetz Environmental Services, Inc., Dallas, Tex.

[21] Appl. No.: 152,856

[22] Filed: Nov. 15, 1993

Related U.S. Application Data

[60] Division of Ser. No. 667,952, Mar. 12, 1991, Pat. No. 5,261,765, which is a continuation-in-part of Ser. No. 458,084, Feb. 5, 1990, Pat. No. 5,011,329.

[51] Int. Cl.$^6$ .................................. B09B 3/00; F02D 3/11
[52] U.S. Cl. ........................ 405/128; 405/131; 405/258; 588/253
[58] Field of Search .................................. 405/128, 129, 405/131, 258; 166/272, 302, 303; 210/170, 747

[56] References Cited

U.S. PATENT DOCUMENTS

| | | |
|---|---|---|
| 2,444,755 | 7/1949 | Steffen ........................................ 166/17 |
| 2,584,606 | 2/1952 | Merriam et al. ........................... 166/21 |
| 3,254,715 | 6/1966 | Morse ......................................... 166/25 |
| 3,293,863 | 12/1966 | Cox et al. . | 
| 3,417,818 | 12/1968 | Dyson ......................................... 166/39 |
| 4,153,110 | 5/1979 | Ridley ....................................... 166/262 |
| 4,348,135 | 9/1982 | St. Clair . |

(List continued on next page.)

FOREIGN PATENT DOCUMENTS

| | | | |
|---|---|---|---|
| 0405067 | 4/1990 | European Pat. Off. . | |
| 3447079 | 3/1986 | Germany . | |
| 3619494 | 12/1987 | Germany . | |
| 3716275 | 11/1988 | Germany . | |
| 3907946 | 8/1990 | Germany . | |
| 4037743 | 6/1991 | Germany . | |
| 702107 | 12/1979 | U.S.S.R. ............................... | 405/131 |
| 990961 | 1/1983 | U.S.S.R. ............................... | 405/131 |

OTHER PUBLICATIONS

"Thermal soil stabilisation—uses pressure–controlled injection of hot gases to stabilise below soil caking temperature," *Soviet Inventions Illustrated*, Sec. PQ, Week K20, Jul. 29, 1983.

"Ground thermal reinforcing method—by mixing solid fuel with soil and feeding hot gas through horizontal channels," *Soviet Inventions Illustrated*, Sec. PQ, Week 50, Feb. 1, 1984.

"Thermal strengthening of ground in massive—involves forcing hot gases through main bore hole and application of vacuum to auxiliary boreholes," *Soviet Patents Abstracts*, Sec. PQ, Week 8930, Sep. 6, 1989.

"Thermal soil stabilisation—uses perforated pipeline installed with calculated gap, sand and grahite mixture, and combustible mixture," *Soviet Inventions Illustrated*, Sec. PQ, Week K12, May 4, 1983.

"Superfund Innovative Technology Evaluation (SITE) Program", HMCRI Conference, Nov. 28–30, 1988.

Brochure by AKI Systems, Inc. (undated).

"Performance of Selected In Situ Soil Decontamination Technologies: An Air Force Perspective", American Institute of Chemical Engineers 1989 Summer National Meeting, Aug. 20–23, 1989.

Terra Vac In Situ Vacuum Extraction System—Applications Analysis Report, Jul. 1989.

Addendum to EPA Site–004 Proposal, Jun. 6, 1989.

*Primary Examiner*—Dennis L. Taylor
*Attorney, Agent, or Firm*—Richards, Medlock & Andrews

[57] ABSTRACT

A technique for in situ decontamination of an earth formation. High gas temperatures can be achieved at subsurface formations by supplying a fuel at a subsurface location, such as at the bottom of a wellbore. Pressurized air or gas preheated to a temperature of about 700° F.–1200° F. is supplied to the wellbore to ignite the fuel. The combustion heat produced by the fuel further heats the preheated gas to temperatures in the range of 1200° F.–4500°, which heated gases are forced out of the borehole into the contaminated formation. Contaminants are thereby volatilized or oxidized and removed from the formation to the surface.

41 Claims, 9 Drawing Sheets

U.S. PATENT DOCUMENTS

| | | |
|---|---|---|
| 4,376,598 | 3/1983 | Brouns et al. . |
| 4,442,901 | 4/1984 | Zison ................................ 166/369 |
| 4,469,176 | 9/1984 | Zison et al. . |
| 4,518,399 | 5/1985 | Croskell et al. . |
| 4,670,148 | 6/1987 | Schneider . |
| 4,670,634 | 6/1987 | Bridges et al. . |
| 4,732,091 | 3/1988 | Gould ................................ 110/229 |
| 4,776,409 | 10/1988 | Manchak, Jr. . |
| 4,832,122 | 5/1989 | Corey et al. ...................... 166/266 |
| 4,834,194 | 5/1989 | Manchak, Jr. . |
| 4,838,733 | 6/1989 | Katz . |
| 4,842,448 | 6/1989 | Koerner et al. . |
| 4,849,360 | 7/1989 | Norris et al. ...................... 405/128 X |
| 4,900,196 | 2/1990 | Bridges . |
| 4,913,065 | 4/1990 | Hemsath ............................ 110/239 |
| 4,919,570 | 4/1990 | Payne ................................ 405/128 |
| 4,982,788 | 1/1991 | Donnelly ............................ 166/266 |
| 5,067,852 | 11/1991 | Plunkett ............................ 405/128 |
| 5,213,445 | 5/1993 | Ikenberry et al. ................ 405/128 |

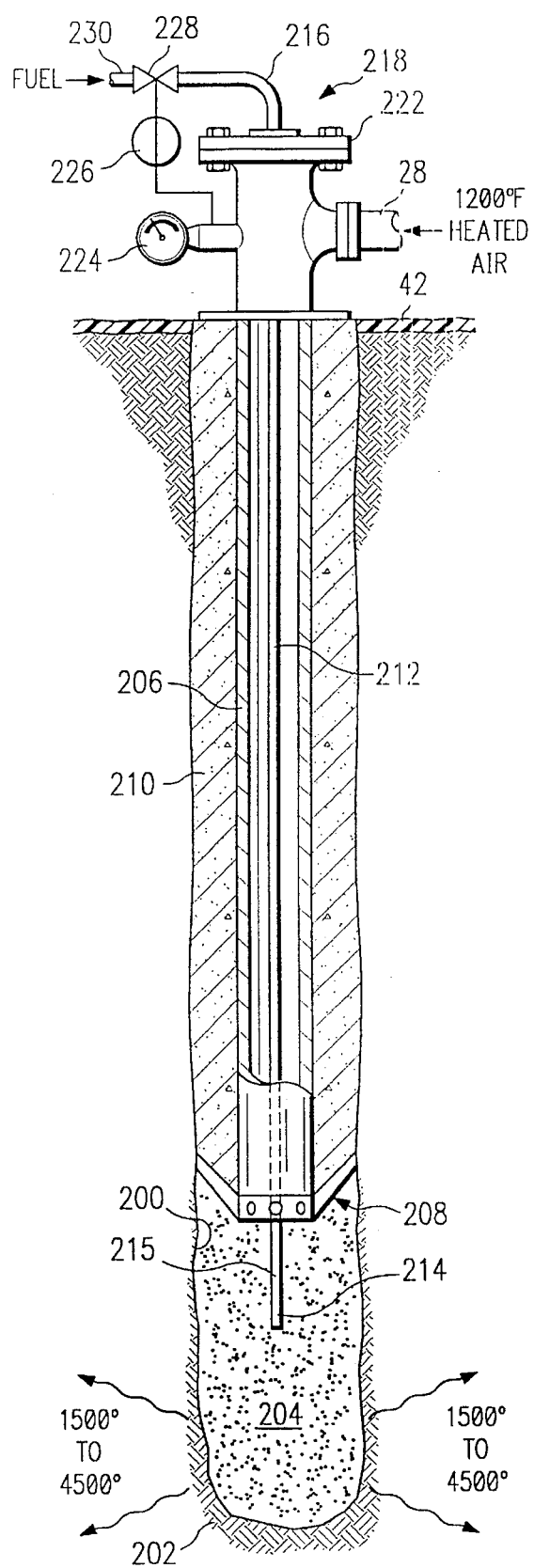
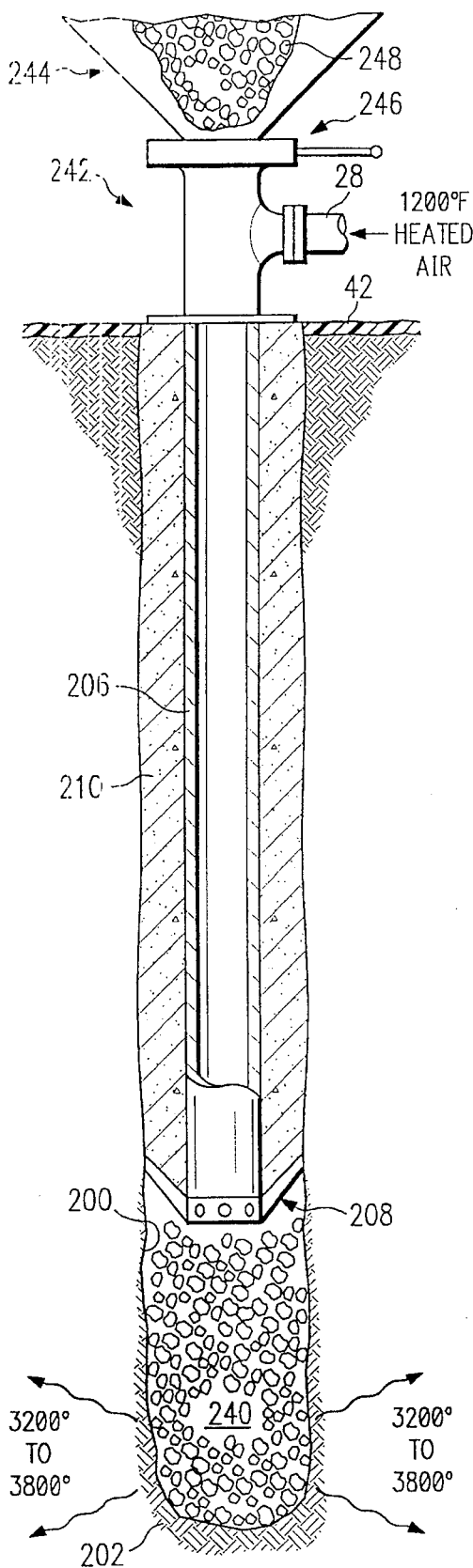
FIG. 12
FIG. 13

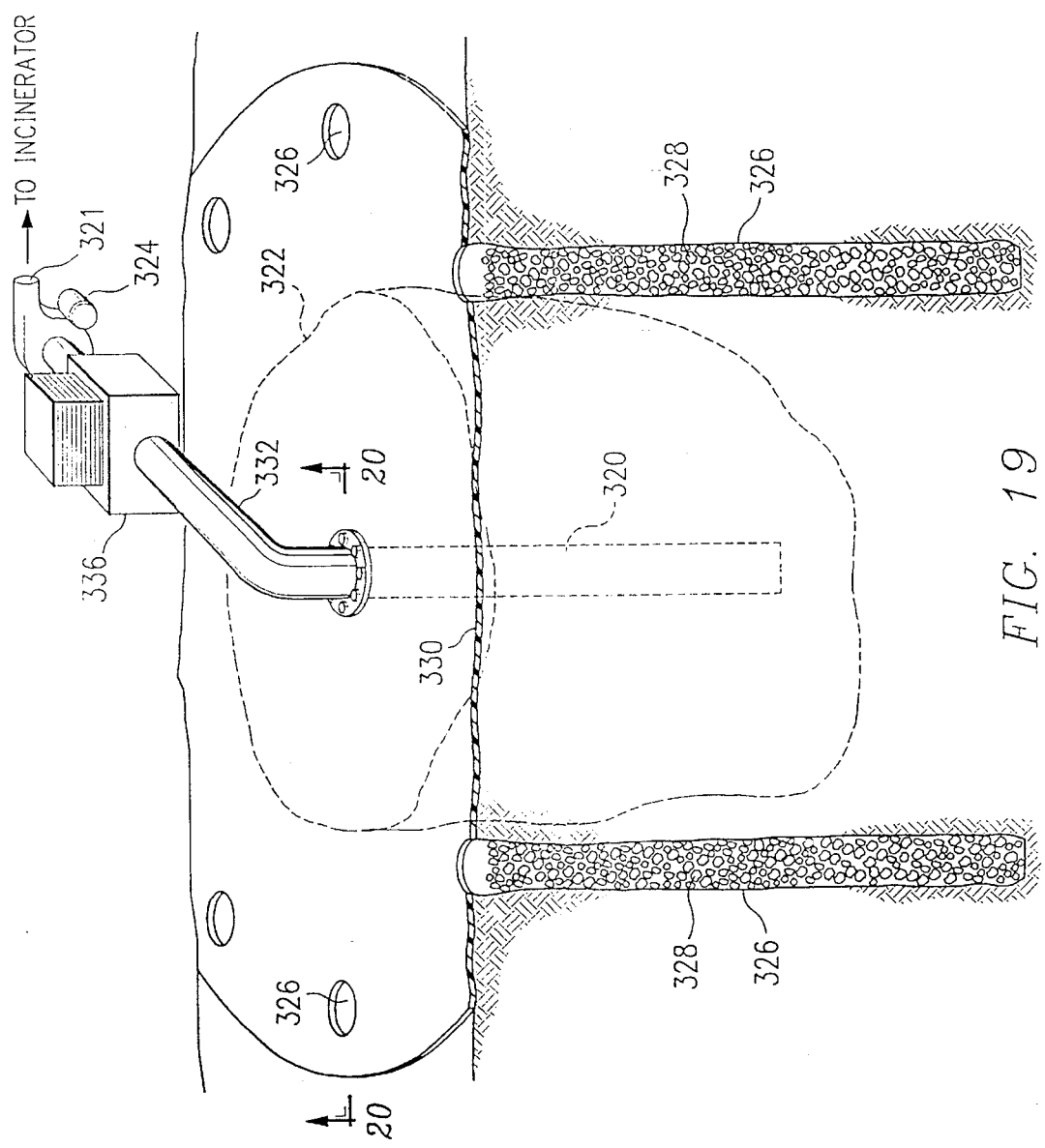

METHOD AND APPARATUS FOR HEATING SUBSURFACE SOIL FOR DECONTAMINATION

RELATED APPLICATION

This is a divisional patent application of U.S. patent application Ser. No. 07/667,952, filed Mar. 12, 1991, now U.S. Pat. No. 5,261,765, which is a continuation-in-part patent application of U.S. application filed Feb. 5, 1990, Ser. No. 458,084, entitled "In Situ Soil Decontamination Method and Apparatus", now U.S. Pat. No. 5,011,329.

TECHNICAL FIELD OF THE INVENTION

The present invention relates in general to the treatment of materials to remove toxic or unwanted substances therefrom, and more particularly relates to the treatment of soil to remove or obviate the effects of toxic or undesirable substances.

BACKGROUND OF THE INVENTION

In recent years, a special awareness or interest has been placed on the quality of the environment. This has been due, in a large part, to the realization that many substances, both old and newly developed, can lead to present and future detrimental effects. Chemicals and toxic materials which adversely affect the air, earth or water present a serious concern as to the storing of such substances, and the subsequent environmental cleanup in the event of contamination of the environment by the inadvertent release of such materials.

One environmental concern that has prompted recent investigation and remedial action is that caused by petrochemical spills and leakages into the earth due to defective containers or pipelines. The oil, gas or fuel which contaminates the soil, if not checked, can pollute the soil as well as contaminate groundwater supplies and aquifers. One technique which has been employed effectively to decontaminate soil is to excavate the contaminated area and to process the soil through a kiln at an elevated temperature. While such a technique is effective, it is apparent that the time, cost and labor is appreciable and not cost effective for large contaminated areas.

The in situ treatment of contaminated soil has been carried out by use of neutralizing chemicals and solvents, as well as nutrients and microorganisms to promote in situ biodegradation of the contaminants. In addition, in situ soil flushing has been carried out by injecting solvents or surfactants into the soil to enhance the contaminant solubility. This technique involves the drilling of an extraction well in the contaminated soil zone, the drilling of reinjection wells upgradient of the contaminant area, and the construction of a waste water treatment system. Subsequent to the soil treatment, the groundwater is reinjected upgradient of the extraction well, which then leaches through the contaminated soil. The leachate is then collected, treated and reinjected back into the system, creating a closed loop system.

Yet another in situ treatment of contaminated soil involves a process in which production wells are drilled through the contaminated soil zone to a depth just above the water table. Monitoring wells are drilled around the production wells to monitor pressure gradients. A vacuum is then applied to the production wells. Because of the horizontal pressure gradient created in the soil zone by the vacuum pumps, volatiles in the soil percolate and diffuse through the air spaces between the soil particles to the production well. The vacuum established in the soil continuously draws volatile organic compounds and contaminated air from the soil pores, and draws free air through the soil surface down into the soil. The volatiles removed from the monitoring wells are then processed through a liquid-vapor separator. This procedure applies no heat input and is limited in both the rate of contaminant removal and the types of contaminants which can be vaporized.

In another variation of the foregoing technique, the treatment system includes injection wells for injecting steam, hot air and liquid chemicals into the churned soil. Extraction wells operating in a partial vacuum environment provide a horizontal pressure gradient in the soil. The mixture heats the soil and raises the temperature of the chemicals, eventually causing them to evaporate. The evaporated chemicals are drawn horizontally to the extraction wells and piped to a processing system that cools the chemical vapors for conversion into a liquid. The liquid chemicals are then further processed by an incinerator to detoxify the contaminants. One disadvantage of this technique is that the steam is prone to condense in the soil and form a liquid barrier to the further movement of contaminants to the extraction wells. Another disadvantage is that the soil temperature cannot be raised substantially above 212° F. to remove less volatile contaminants.

In U.S. Pat. No. 4,670,634, there is disclosed a technique for decontaminating soil by the use of radio frequency energy to heat the soil. Electrodes located over the surface of the decontaminated area radiate RF energy into the soil and heat the soil to the extent that gases and vapors are produced. The rising gases and vapors are collected by a vapor barrier which operates under a slight vacuum. While the system appears to be effective, the energy requirements are substantial and costly, and the depth of the heat penetration into the soil is limited.

In those in situ decontamination systems where the soil is heated to either vaporize or oxidize the contaminants, there is the recurring problem of how to deliver the energy to the contaminated zone in the most efficient manner. As noted above, in heating the soil with RF energy, such a technique is costly and time consuming. Experimental in situ decontamination efforts have been carried out in which hot gases generated by surface heaters are carried by ducts and forced into injection wells. Since there is a limit to which air can be heated, conveyed and injected, there is a corresponding limitation to which the subsurface soil contaminants can be heated. As a result, soil contaminants characterized by low volatilities, such as polychlorinated biphenyls (PCBs), are difficult to remove from the soil as they require substantially high soil temperatures.

While many of the foregoing techniques are somewhat effective in providing in situ decontamination of the soil, many of the shortcomings attendant with such techniques are that the processes incur high operating expenses, require expensive equipment or chemicals, are limited in the rate at which energy can be introduced into the soil and as a final result are not overall extremely effective in reducing contaminants to a very low level.

From the foregoing, it can be seen that a need exists for a technique for the improved in situ removal of contaminants from a material. A further need exists for an efficient method and apparatus for the in situ decontamination of soil to a very low level, and which reduces the possibility of releasing or expelling such contaminants into the air. Another need exists for apparatus for controlling the injection of a heated gas into contaminated soil such that vapor condensation is minimized and permeability of the material to the heated gas is enhanced. Another need exists for the enhanced removal of contaminants by the use of a vertical pressure gradient to thereby eliminate the need for monitoring or extraction wells. Yet another need exists for an efficient utilization of energy, in which combustion gases, which used in heating the injection gas, are also injected into the contaminated soil to raise the temperature so that volatile and less volatile contaminants can be vaporized. Yet another need exists for a technique to deliver high temperature gases to subsurface formations to achieve oxidation of low volatile contaminants.

SUMMARY OF THE INVENTION

In accordance with the invention, a soil decontamination technique is disclosed which substantially reduces or eliminates many of the shortcomings associated with the corresponding prior art techniques.

According to the invention, a heated gas is injected into the contaminated zone. As the heated gas horizontally permeates the zone and returns to the surface, the contaminated soil water evaporates and is carried by the hot gas stream to the surface. Surface collection equipment is utilized to collect the vaporized contaminants for further disposal thereof. The water vapor in the gas stream which is initially forced through the contaminated matter is controlled as to temperature and pressure to minimize recondensation and thus prevent flooding of the zone ahead of the hot gas stream. The permeability of the soil is increased and thus the flow rate of the heated gas is not restricted. The gas can be heated upwardly to 1200° F., or higher, to achieve a soil temperature to vaporize volatile and less volatile contaminants, and also to oxidize other contaminants. Accordingly, the rate at which contaminants can be removed from the soil is improved over the prior, well-known steam injection technique.

According to the preferred embodiment of the invention, casings are installed in wellbores drilled in patterned locations in the vadose zone of the contaminated soil. The casings are cemented at the upper ends so that hot injection gases can be forced laterally into the soil at the bottom of the well. According to this technique, hot gases at a temperature of about 1200° F. are injected down the casing. A combustion fuel is also fed to the bottom of the well by a separate conduit. The bottom of the well is filled with small stones or aggregate to provide a rapid heating of the fuel which, after becoming sufficiently heated, provides further combustion and increased gas temperatures. Gases forced laterally into the soil at the bottom of the well can achieve temperatures well in excess of 3000° F. The fuel fed to the bottom of the well can be regulated as to flow rate to achieve a desired injection gas temperature.

According to another embodiment, increased gas temperatures can be achieved by utilizing a solid fuel at the bottom of the injection wellbore. With this technique, a bottom portion of the wellbore is initially filled or packed with a solid fuel, such as coke, coal or charcoal. Preheated injection gases are then forced down the injection well to ignite the solid fuel. Thereafter, the temperature of the gases forced down the injection well can be regulated to achieve a desired downhole gas temperature. The high temperature gas is then forced laterally from the bottom of the well into the contaminated formation. Gas temperatures of about 2000° F.–3800° F. can be achieved with this technique.

As an alternative to this latter embodiment, horizontal trenches can be formed in the contaminated soil. Apertured pipes adapted for carrying the hot gases are laid in the trenches and covered with an insulating layer of soil, sand, etc. A solid fuel is laid over the insulating layer, and then covered with the contaminated soil. Again, preheated gases are injected into the pipes, which gases exit the pipes through the apertures and ignite the solid fuel. The insulating layer prevents overheating of the apertured pipes. The combustion of the solid fuel provides gas temperatures of about 2000° F.–3800° F. These high temperature gases are forced outwardly from the trenches into the contaminated soil to thereby vaporize and/or oxidize low volatility contaminants.

BRIEF DESCRIPTION OF THE DRAWINGS

Further features and advantages of the present invention will become apparent from the following and more particular description of the preferred embodiment of the invention, as illustrated in the accompanying drawings in which like reference characters generally refer to the same or similar elements or functions throughout the views, and in which:

FIG. 12 is a side sectional view of an injection well adapted for burning a liquid fuel at the bottom of the well to achieve high gas temperatures;

FIG. 13 is a side sectional view of an injection well adapted for burning a solid fuel at the bottom of the wellbore;

FIG. 19 is an isometric view of a sectioned portion of a contaminated zone in which a vacuum extraction well is formed to cause the movement of air heated by other fuel-loaded wells.

DETAILED DESCRIPTION OF THE INVENTION

Figure 1:
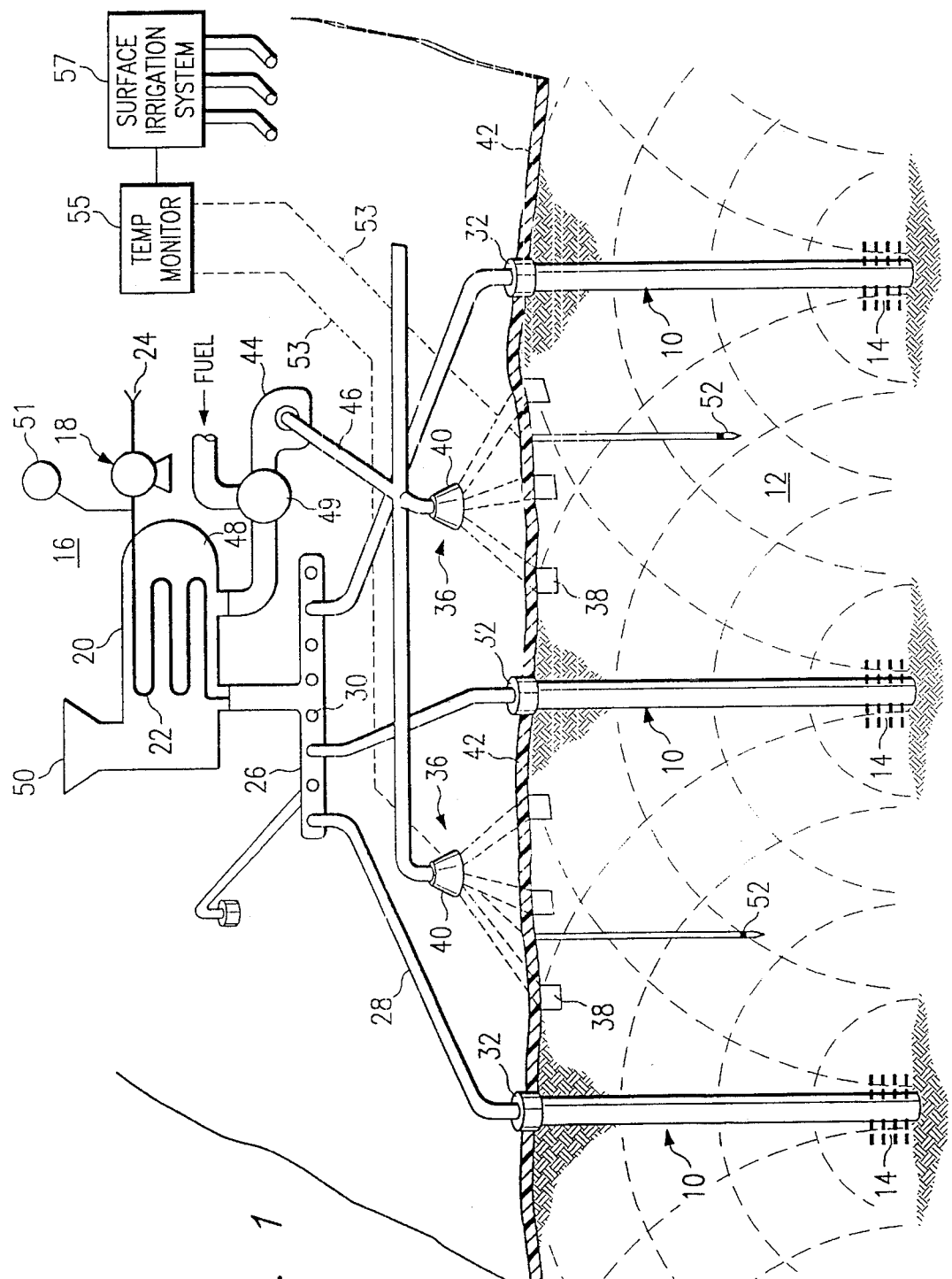
FIG. 1 illustrates the major components of the in situ soil decontamination system of the invention, and particularly a cross-sectional view of the contaminated area and the zone affected by the injected, heated gas.

FIG. 1 is a diagrammatic illustration of the invention in an environment in which it can be advantageously practiced. Shown are a number of hot gas injection wells 10 drilled or otherwise formed in a contaminated soil zone 12. According to one technique, the injection wells 10 are each lined with a casing in such a manner that slots formed at a lower end allow pressurized hot gases 14 to horizontally penetrate the contaminated soil 12. Preferably, the injection wells 10 are drilled to a depth at least as deep as the contaminated soil and preferably somewhat deeper in order to allow the laterally directed gases 14 to permeate all regions of the contaminated soil 12. The decontamination technique of the invention is generally applicable to contaminated materials in the vadose zone, i.e., that zone of the earth above the permanent groundwater level.

As will be described in more detail below, the hot gases 14 are injected into the wells with a heat sufficiently high to vaporize the soil moisture and carry such moisture vapor, as well as vaporized contaminants, under the influence of differential vertical pressure gradients and gravity to the surface of the earth. Such a technique is highly advantageous in removing volatile and less volatile hydrocarbons, as well as other diverse types of contaminants.

A source of pressurized hot gases is shown as reference character 16. In one embodiment, air is utilized as the gas which is heated, pressurized, and injected into the wells 10. The gas heating and pressurization apparatus includes a compressor 18 and a furnace 20 equipped with an internal heat exchanger 22. The furnace 20 preferably includes a fuel-fired burner 49 for heating the heat exchanger 22 to a high temperature. As the compressor 18 draws in air or gases from an inlet 24 and forces such gases through the exchanger 22, such gases reach a temperature which may range upwardly 1200° F. before injection into the wells 10. The temperature to which the gases are heated is a function of the distance that such gases travel before being injected in the wells 10, as well as the nature of the contaminants to be removed. From the heat exchanger 22, the hot gases exit the furnace 20 and are routed to a manifold 26. The manifold 26 is essentially a large ported structure to which a number of pipes 28 are connected for further routing of the hot gases to the individual injection wells 10. The unused manifold ports 30 are simply capped to prevent the escape from the system of the hot injection gases. The manifold 26, as well as the pipes 28 can be insulated to improve the thermal efficiency of the system.

Each injection well 10 includes a "cross" wellhead 32 for providing instrumentation couplings, as well as apparatus for coupling the hot gas pipes 28 to the casings of the injection wells 10. The hot gases generated from a primary fuel combustion and forced in the injection wells 10 can be utilized to vaporize contaminants in the formation 12, or can be used as a preheated gas to ignite fuel for a secondary combustion at the bottom of the injection well 10. Both techniques are described in greater detail below.

A central contaminant collection system 36 is effective to collect the contaminant vapors and gases (vent gases) which have risen to the surface of the soil 12. The contaminant collection system 36 includes a network of trenches 38, all of which are dug toward a central vapor collector 40. Importantly, the surface of the soil 12 is covered with an impervious barrier 42 to prevent the escape of vapor contaminants into the atmosphere. The impervious barrier 42 extends sufficiently beyond the lateral boundaries of the contaminated area. A suction blower 44 is connected to each of the central vapor collectors 40 to draw the vent gases into an input plenum 46 and force such vent gases into the furnace 20. As can be appreciated, the suction blower 44 maintains the trenches 38 generally at a below atmospheric pressure level, thereby drawing the vapor contaminants vertically out of the soil. The necessity for extraction wells is thereby obviated.

In accordance with an important feature of the invention, the vapor contaminants are forced into a high temperature firebox 48 of the furnace 20 where they are incinerated and output via an exhaust 50 into the atmosphere as harmless gases. The combined gas heater and incinerator assembly comprising a tubular coil 22, through which the gas to be heated flows, is arranged in the discharge plenum of a firebox 48 in such a way that the gas being heated flows countercurrently to the direction of the flue or combustion gases generated by combustion of a hydrocarbon fuel in burner 49. This apparatus utilizes as combustion air the vent gases containing hydrocarbon contaminants removed from the soil 12, and forced by suction blower 44 into the burner air inlet ports.

In a typical application, 5000 pounds per hour of air are compressed by compressor 18, from atmospheric pressure to about 18 psig. The compressor 18 can be either a reciprocating piston compressor, a turboblower, or a direct displacement blower. The compressed air is forced through the tubular heat exchanger coil 22 where it is raised from the compressor discharge temperature of approximately 300° F., to the desired injection temperature which ranges up to about 1200° F. The heat required is supplied by burning a hydrocarbon fuel at burner 49 in the firebox 48. The temperature of the gases can be regulated by appropriate control of the flow rate of the fuel fed to the burner 49. By utilizing the vent gases containing the hydrocarbon contaminants removed from the soil 12 as combustion air, the contaminants are thermally and oxidatively destroyed, and converted into harmless carbon dioxide and water vapor, at the flame temperature of approximately 1500° F., or higher. This process is in contrast with prior art techniques, in which the contaminants are generally condensed, collected, and transported to an approved site for appropriate disposal.

As will be described more fully below, thermocouple temperature probes 52 may be driven into the contaminated zone 12 to obtain temperature reading. As an alternative, the vent gas temperature may be monitored at the various points of surface recovery, such as in the trenches 38. In any event, the electrical signals representative of soil temperatures are coupled by wires 53 to a temperature monitor 55. The temperature monitor 55 can be connected to a surface irrigation system 57 to irrigate certain soil areas to reduce subsurface channeling of hot injection gases 14. The surface irrigation system 57 is adapted to selectively wet the surface of the soil areas indicated by the temperature monitor 55 as being hotter than other areas.

In order to return moisture to the soil after the decontamination process is completed, water vapor or a mist can be introduced into the compressed gas, such as by a mist injector, illustrated by reference numeral 51. The mist injector 51 can be activated to inject moisture into the compressed air stream, after the burner 49 has been shut off and the air stream has returned to a normal operating temperature.

Figure 2:
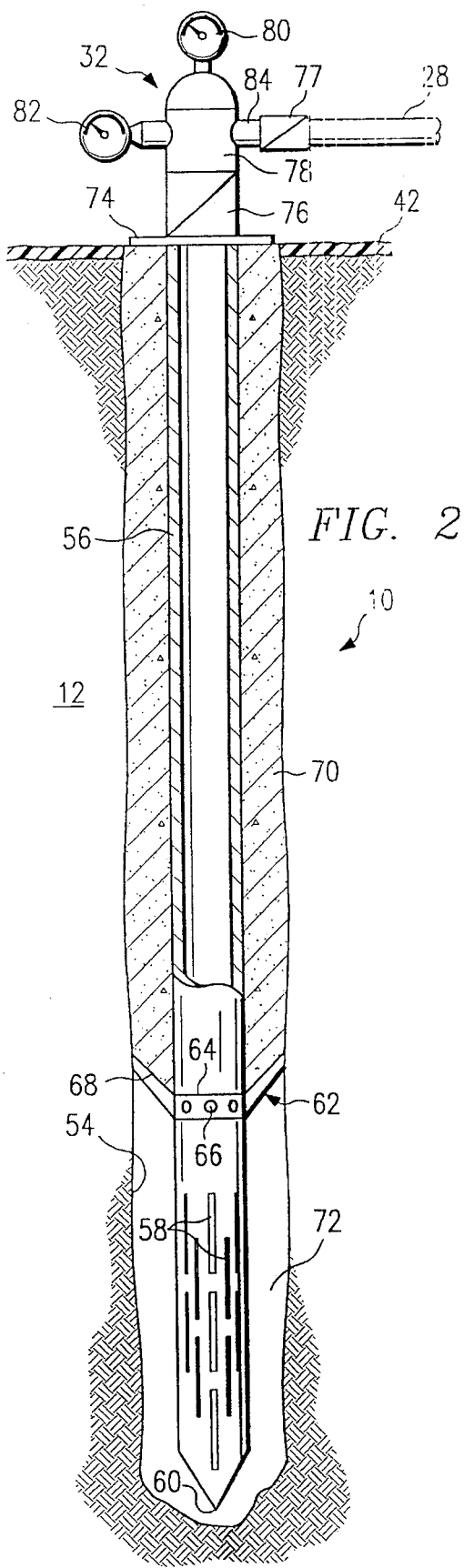
FIG. 2 is a sectional view which illustrates the detailed structural features of a wellbore and casing especially adapted for injecting heated gas into the earth.

Having described the basic structural and operational features of the invention, reference is now made to FIG. 2 where further details of the invention are shown. In order to properly and thoroughly remove the contaminants from the soil 12, it must first be determined the extent of the contamination, the type of the soil, porosity, moisture content and the type of contamination. Such information can be obtained by drilling sample boreholes, extracting soil samples, and through laboratory analysis determining the noted information. After the pattern of the contaminated area has been determined, injection wells are drilled within the contaminated soil area, as well as on the border of the area. The wells may be located in and about the contaminated zone, as dictated by soil tests to determine contaminant concentration, soil texture, etc. In the event that the contaminated area is larger than can be accommodated by the in situ decontamination apparatus, various sections of the area can be decontaminated in a sequence, until the entire area has been decontaminated. In this case, a certain degree of overlap between sections may be required in order to assure substantially complete removal of the contaminants.

It has been experimentally determined that the injection gases 14 permeate laterally outwardly from the well 10 to a distance about equal to that of the depth of the well. Hence, the injection wells 10 can be appropriately spaced in and about the contaminated area to assure that complete hot gas permeation of the soil is achieved. As will be described more fully below, the slotted sections in certain of the injection well casings are bladed to direct the hot gases in a specified pattern, and thereby minimize the injection of gases 14 in areas of little or no contamination. Such bladed casings are well adapted for use around the periphery of the contaminated zone 12.

In accordance with one technique, the boreholes 54 of the injection wells 10 (FIG. 2) are formed with a diameter of about six inches. A casing, pipe, or tube 56 of about 2⅜ inch to 4 inches, depending on the rate of injection desired, is then assembled for lowering into the boreholes 54. The casing 56 is smaller in diameter than the borehole 54, and is preferably constructed of steel. Further, a number of vertical slots 58 are formed in the bottom portion of the casing 56. The slots 58 are about eight inches in length and about ⅛ inch in width. While vertical slots are disclosed, other aperture shapes and sizes may function to disperse injection gases 14 with equal effectiveness. The bottom edge 60 of the casing is pinched together and suitably sealed, such as by welding. At a location just above the slots 58 there is removably attached an annular expandable cement basket 62. The cement basket 62 includes an annular flange 64 which is fastened to the casing outer sidewall 56 with shear pins 66. The expandable cement basket 62 includes a conical expandable annular member 68 which allows it and the casing 56 to be lowered into the borehole 54. After the casing 56 and attached expandable cement basket 62 are lowered to the proper location in the borehole 54, the upper annulus is filled with cement 70 and allowed to set. The expandable basket annular member 68 prevents the cement from filling a lower annulus portion 72 of the borehole 54. The cement 70 is of the type which can withstand high temperatures without fracturing, cracking or otherwise deteriorating. Preferably, the high temperature composition is a mixture of Class H cement, silica flour and perlite mixed with water. This mixture has been laboratory tested and is usable at temperatures in excess of about 900° F. In addition, the cement 70 prevents the leakage of the pressurized hot gases 14 upwardly in the borehole, thereby forcing the hot gases 14 to permeate throughout the contaminated soil 12. The cement basket 62 can be sheared from the casing 56 to allow retrieval of the casing 56 after the decontamination process is completed.

A flange or collar 74 screwed to the top of the casing 56 allows for the connection thereto of a ball valve, schematically shown as reference character 76. The ball valve 76 is manually adjustable to seal off the injection well 60 and retain formation pressure after injection is completed. Fixed atop the ball valve 76 is a cross wellhead 78 which is equipped with a pressure gauge 80, a temperature gauge 82 and a fitting 84 for attachment to the hot gas pipe 28. The pressure gauge 80 can be monitored to detect rises in pressure which are indicative of soil flooding due to condensation. The fitting 84 may be any of the well-known type which can withstand the temperature and pressure characteristic of the hot gases. A manually adjustable valve 77 is fixed between the pipe line 28 and fitting 84 to control the rate of injection of hot gases 14 into the well 10. The pipe line 28 is sized to enable delivery of a sufficient volume of hot gases through the contaminated soil, depending upon the porosity and texture thereof. The hot gas pipe 28 is generally sufficient to deliver at least 1500–2500 standard cubic feet per minute (SCM) of hot gases 14 to the injection well 10.

Figure 3:
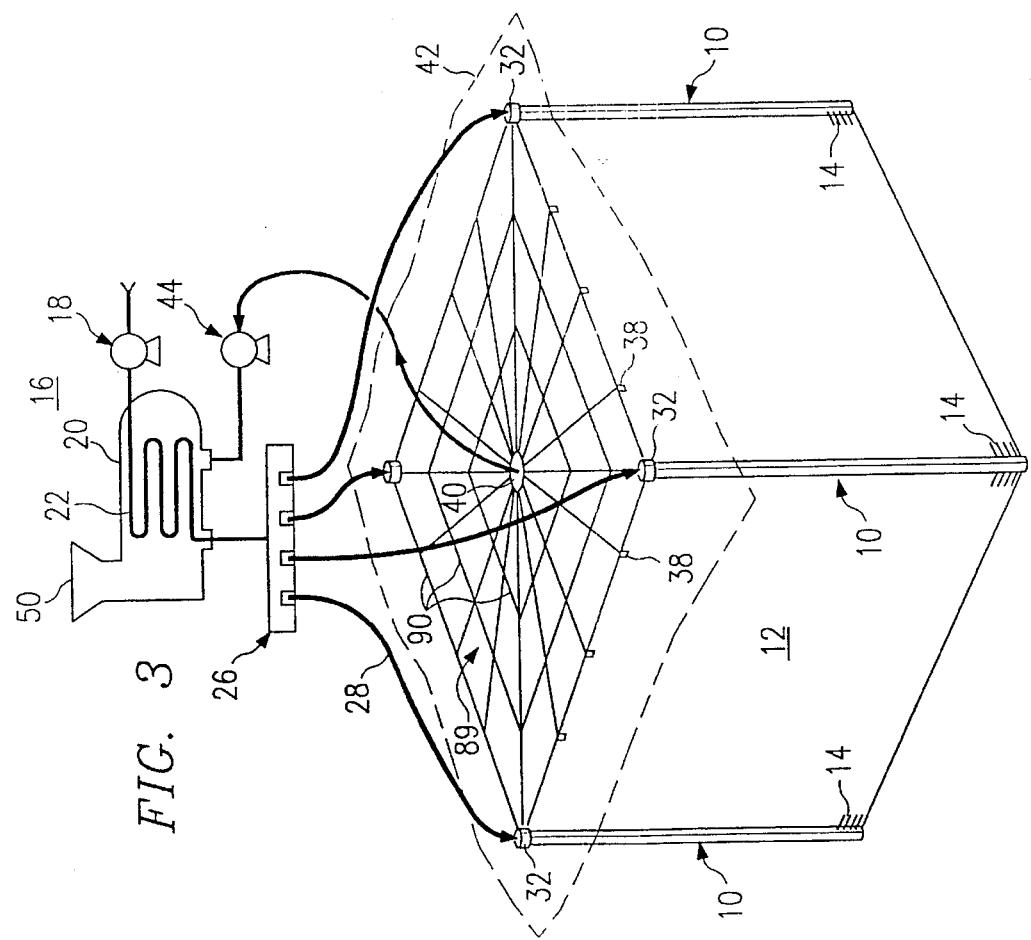
FIG. 3 is an isometric view which illustrates the surface recovery system employed in accordance with the preferred embodiment of the invention.

Once the construction of all of the injection wells 10 has been completed, a trench network 89 is formed between the injection wells 10. FIG. 3 illustrates one type of trench layout for recovering contaminated vapors drawn vertically out of the soil 12. Illustrated is a contaminated soil zone 12 which is generally square or rectangular in shape, with a hot gas injection well 10 formed in the earth at the corners of the zone. The trench network 89 includes a number of individual trenches 38 which are arranged radially inwardly toward a central collection point 40. The trenches 38 can be dug to a convenient depth, such as 6–12 inches, with a width of corresponding dimensions. In addition, shown are a number of other trenches 90 which intersect with the radial trenches 38, and are generally orthogonal thereto. Other types or configurations of trenches may be utilized with equal effectiveness to recover the contaminated vapors for incineration, or other disposal.

Figure 4:
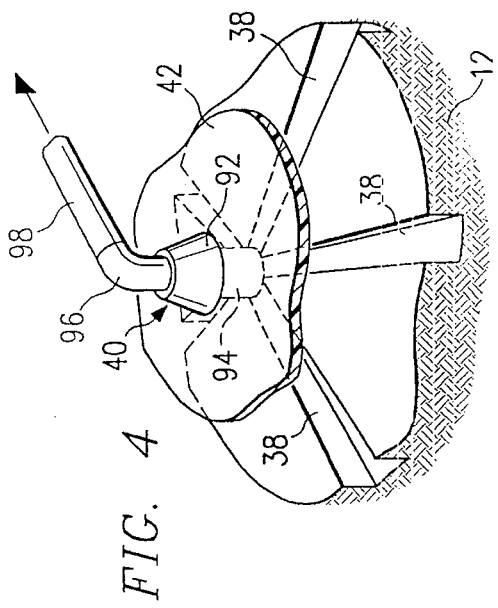
FIG. 4 is an isometric view which illustrates a central collection point from which the contaminants are extracted and directed by trenches to disposal equipment.

Preferably, the trenches 38 and 90 are left open to provide conduction channels of the contaminated vapors directed toward the central collection point 40. After the trench network 89 has been completed, the entire area is covered with the impervious material 42. The impervious material 42 can be a heavy gauge, heat resistant foil or other material which is impervious to the type of vapor contaminants brought to the soil surface by the decontamination system of the invention. After the contaminated area has been covered with the impervious material 42, the vapor gas central collector 40 is installed so it is sealed to the impervious material 42 and is connected at a point common of a plurality of the trenches 38. The vapor gas collector 40 is shown in more detail in FIG. 4. The vapor gas collector 40 is constructed of sheet metal, including a bonnet 92 attached to a base 94 which rests on the surface of the earth. The vapor collector 40 is preferably located over an intersection common to plural radial trenches 38. The top of the bonnet 92 includes an elbow 96 which connects to a low pressure return pipe 98 which is coupled to the suction blower 44. The impervious material 42 is fastened around the collector 40 by a band or collar, or other suitable means.

Figure 5:
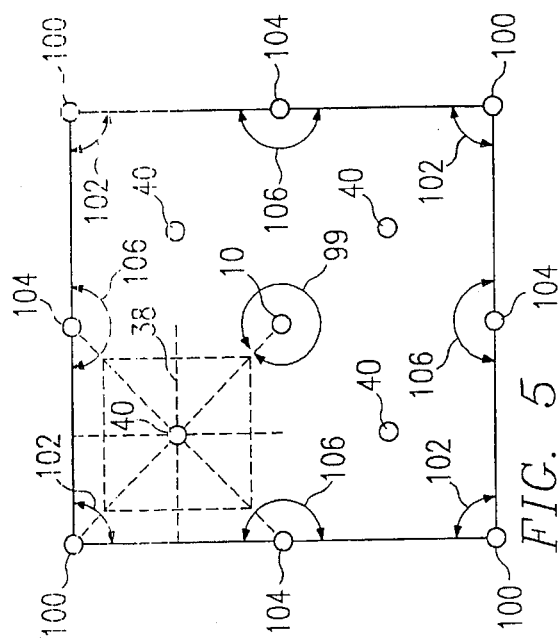
FIG. 5 is a top view of a contaminated site with spaced apart boreholes which are adapted to direct a heated gas in the soil with a predefined pattern.

FIG. 5 illustrates a technique for injecting hot gases 14 into the earth in a predetermined pattern commensurate with the shape of the contaminated area. A basic injection well grid pattern is utilized to determine spacing of the injection wells 10. The design of the pattern is dependent on the depth of the base of leachate, concentration of contamination and soil permeability. The basic grid pattern may be expanded or contracted to effectively cover the affected area. For purposes of example, the contaminated area is illustrated as being square. A hot gas injection well 10 is formed centrally within the square, and includes casing slots all around the bottom portion thereof so that the hot gases 14 permeate laterally in a pattern 360° around the well 10. The circumferential hot gas permeation pattern is shown as numeral 99. A cone of hot gas permeation thereby extends entirely around the central hot gas injection well 10. Located at each corner of the contaminated area is an injection well 100 which has slots formed in the sidewall of a bladed casing in a 90° angular area of the casing. The hot gases 14 are directed into the contaminated soil in a pattern of 90°, thereby concentrating the dispersal of hot gases in the corner of the contaminated soil zone. The pattern is shown by the arrow 102. Between each corner hot gas injection well 100 there are formed other boundary injection wells 104 which have slots formed in a lower part of bladed casings covering a 180° angular area thereof. Accordingly, the hot gases 14 forced out of the slots are directed outwardly in a pattern of 180°, thereby concentrating the permeation of hot gases to the soil locations intermediate the corner wells 100 and in the contaminated zone.

Figure 6:
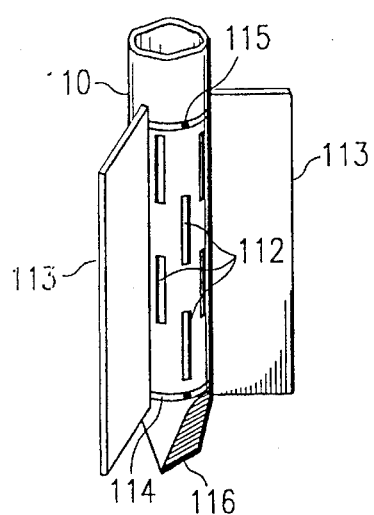
FIG. 6 is a side view of a bladed casing having a quarter section slotted for directing gases in a 90° pattern.

FIG. 6 illustrates a bottom portion of a casing 110 adapted for directing hot gases in a 90° pie-shaped pattern around the wellbore. A number of apertures or slots 112 are cut in the casing 110 in an angular surface area thereof which subtends an arc of about 90°. A pair of blades 113 are spaced apart 90° to enclose the slots 112 and enhance the directionality by which the gas is injected into the contaminated zone 12. The blades 113 may be slightly larger in diameter than the diameter of the borehole to reduce gas leakage therearound. The blades 113 are held together by a pair of metal bands 114 which, in turn, are attached to the casing 110 by shear pins or bolts 115. When it is desired to pull the casing after the decontamination process is completed, the blades 113 can be sheared from the casing should such blades become lodged in the borehole. As further shown in FIG. 6, the casing 110 is pinched together at a bottom edge 116 to cap the bottom end so that hot gases 14 are forced to exit the borehole in a lateral direction.

Figure 7:
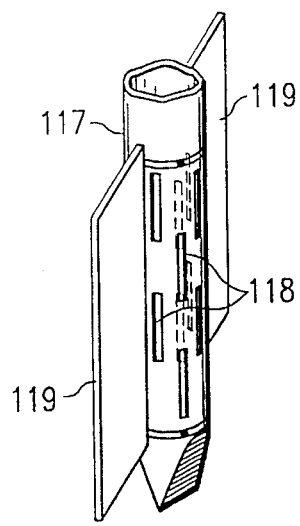
FIG. 7 is a side view of a bladed casing having a half section slotted for directing gases in a 180° pattern.

FIG. 7 is illustrative of another embodiment of a casing 117 in which a number of slots 118 are symmetrically formed around only half of the casing 117. A pair of blades 119, spaced apart 180°, enhance the directionality of the gas injected into the contaminated soil 12. In this manner, hot gases 14 are directed from the casing 117 in a pattern of 180° surrounding the casing 117. It can be appreciated that by forming the slots and blades in patterns other than shown, other directional hot gas patterns can be realized. For example, certain soil conditions may allow for desired directivity of the injected gases by using casings shown in FIGS. 6 and 7, but without the guide blades. It may be found that the resulting pattern of injected gas is lobe shaped, with minor or insignificant spillover into areas of no concern. Yet other techniques of patterned gas injection may be employed, such as backfilling a portion of the borehole around a slotted casing with cement so that the gas escapes only from a circumferential portion of the casing.

Figure 8:
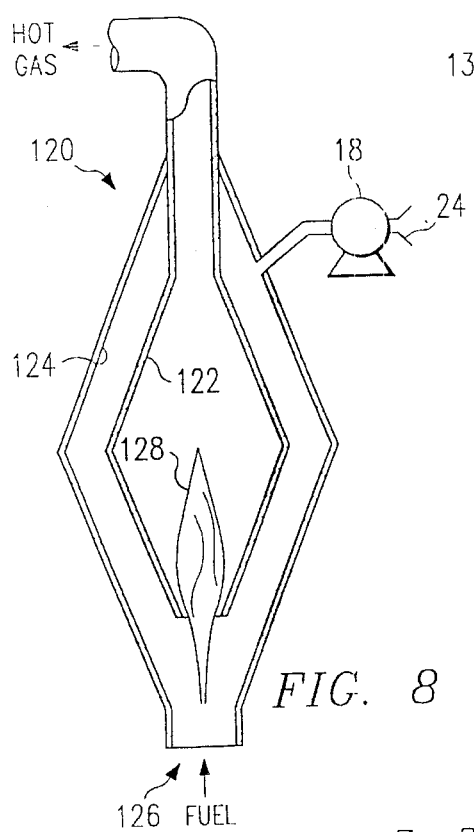
FIG. 8 is a side sectional view of a pressurized gas heater which can be employed for on-site heating of a pressurized gas for injection purposes.

FIG. 8 illustrates an embodiment of a gas heater adapted for use with the invention, should separate heater and incinerator apparatus be desired. An adiabatic gas heater 120 provides hot combustion gases under pressure for injection into the contaminated soil 12. The heater is an assembly in which a biconical flame chamber 122 is suspended inside a biconical exterior housing 124. Air or a gas enters compressor 18 through intake port 24. The air is compressed to the desired injection pressure, typically 15 to 20 psig. The compressed air enters the top of the biconical annulus 124 and flows downwardly in a spiral, thus absorbing the heat transmitted from the inner biconical flame chamber 122, thereby rendering the overall assembly adiabatic. The air then mixed in a burner 126, where it is combined with a hydrocarbon fuel injected to operating pressure through burner 126, and is ignited into a stable flame 128 within the inner biconical chamber 122. Complete combustion is obtained, resulting in a hot flue gas under pressure sufficient for injection into the soil. Typically, it is expected that the flue gas will range in temperature between a compressor discharge temperature of about 300° F. to 1200° F. The composition of the flue gas depends on the temperature at discharge, which is a function of the amount of air in excess of the stoichiometric quantity needed to completely combust the fuel. This excess ranges from infinity, at 300° F. to 4:1 excess at about 1200° F., approximately. Since the compressed flue gas contains moisture of combustion, a considerable amount of excess air is needed so that the moisture content will be low enough to allow the air injected into the soil to absorb and remove additional water. With a 4:1 ratio of excess air, the moisture content will result in a 90° F. dew point. At 300° F., where substantially no combustion takes place, the dew point will be that of the ambient air, typically 40° to 70° F. Within this range, which is expected to be utilized during operation, the injected flue gas will have ample capacity to absorb additional water evaporated from the soil. A burner which is adapted to heat a pressurized gas is available from Thermoflux, Inc., of Tulsa, Okla.

Figure 9:
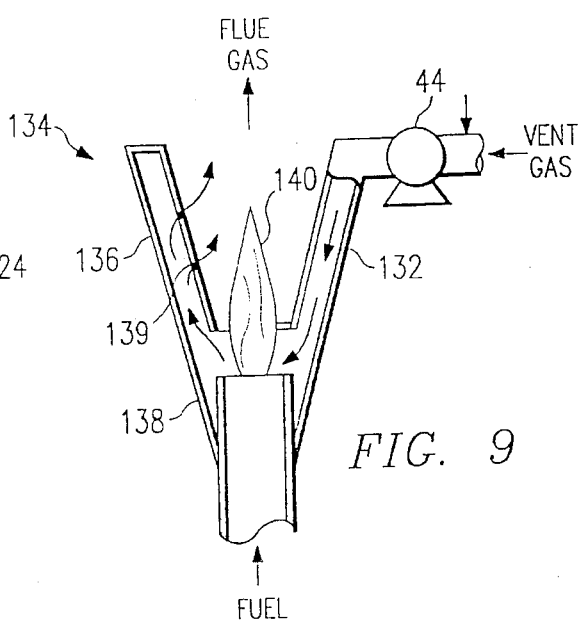
FIG. 9 is another embodiment of a heater which can be utilized for incinerating vaporized contaminants recovered as a vent gas from the soil.

In the event that separate gas heater apparatus and incinerator apparatus is employed, the vapor contaminant disposal technique of FIG. 9 can be utilized. The vent gas from the soil 12, which may contain low concentrations of hydrocarbon contaminants, is recovered from the vent gas collection system under a slight negative pressure by suction blower 44, which injects it into the annulus 132 of an inverted conical incinerator 134. An incinerator suitable for such use is obtainable from Thermoflux, Inc. of Tulsa, Okla. The flue gas enters the conical annulus 136, near the top and recovers heat transferred from the hotter internal cone, as it progresses spirally downward to the apex 138 of the cone, where it is mixed with fuel and burned. Perforations 139 located near the bottom of the annulus 132 allow the heated vent gas to escape with the combustion gases as a flue gas. The high temperature of the flame 140, in excess of 1500° F., causes the contaminants to be thermally and oxidatively converted into harmless water vapor and carbon dioxide for discharge to the atmosphere.

Figure 10:
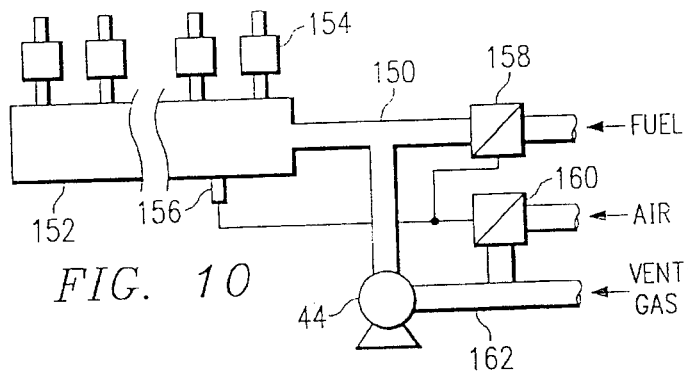
FIG. 10 schematically depicts a catalytic oxidizer for on-site disposal of contaminated vapors.

An alternative to the foregoing decontamination technique is shown in FIG. 10. The main advantage to this latter technique is that it uses less fuel to convert the contaminants oxidatively into carbon monoxide and water. The vent gas from the soil, which may contain low concentrations of hydrocarbon contaminants, is recovered from the vent gas collection system under slight negative pressure by suction blower 44, which injects it into the burner 150, sufficient to raise the temperature of vent gas in the manifold 152 of the vent gas catalytic converter 154 to about 300° F. to 400° F. as required for the operation of the standard automobile catalytic converters. As illustrated, the catalytic converters 154 are arranged in parallel to supply sufficient capacity for the vent gas stream. The converters 154 catalytically oxidize the contaminants and discharge the gas harmlessly to the atmosphere. At times when the vent gas entering the blower 44 is higher than about 400° F., a temperature controller 156 shuts off the fuel to the burner 150 with valve 158 and opens an air valve 160 at the intake 162 of blower 44 to maintain the proper temperature of the gas entering the catalytic converters 154.

Having described the details of the structural features of the invention, the exemplary steps of the in situ soil decontamination technique are set forth below. Soils in general do contain water under normal conditions, but in vastly different degrees. The soil may be saturated or lie beneath the water when the soil is below the water table, or when water has percolated downwardly after surface rains or floods. The water can be contained in the pore spaces between soil particles, or water can be adsorbed on the surface of the particles. Soil which is saturated with water or beneath the water table functions as a barrier to the flow of gases to the soil, at practical flow pressures and rates. The water contained in the pore spaces between the soil particles may, or may not, impede the flow of the injection gases, depending upon the fraction of the pore space which is occupied by the liquid water. On the other hand, in conditions where the water is adsorbed on the surface of the soil particles, such water is not free to flow, but the transmission of gases therethrough is not substantially impeded.

In the event that the contaminated soil is fully saturated with water, such as that which is located below a water table, the water can be gravity drained by the injection wells drilled to or below the bottom of the contaminated zone. Such wells can later serve as the boreholes for insertion of casings to inject the hot gases in the contaminated zone. The wells can be utilized to remove substantially all of the liquid water from the zone.

After the decontamination apparatus has been connected together and tested for operability, the compressor 18 is started, as is the suction blower 44. The burner 49 is not ignited and thus air or gas at a compressor outlet temperature of about 300° F. is forced into the injection wells 10. Initially, the compressor 18 is adjusted to force a gas through the heater-incinerator assembly 20 such that the pressure, as measured at the wellhead, is about 8–15 psig for a well having a depth of about twenty feet. If the contaminated zone is much deeper, for example, fifty feet, it may be necessary to increase the wellhead pressure, for example, to about 20–30 psig, due to the higher hydrostatic head at the greater depth. This initial pressure of the low temperature gas gradually moves the liquid water from the wellbore, thus establishing greater gas permeability within the contaminated soil 12. However, a higher pressure may be required to overcome threshold effects of initially generating a water flow through the contaminated soil 12.

Figure 11:
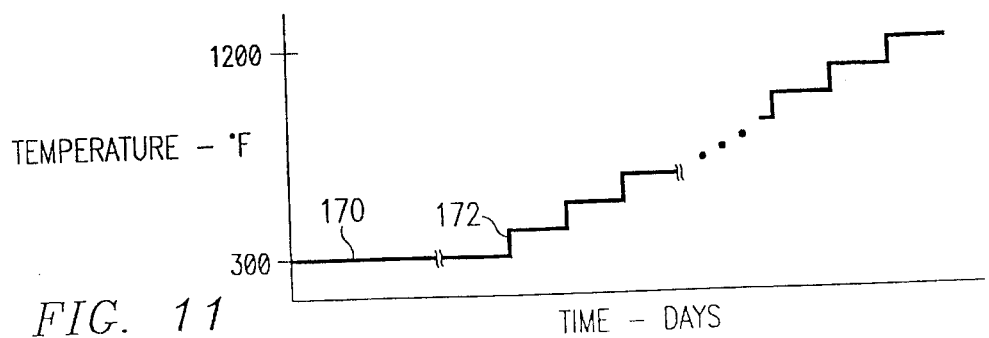
FIG. 11 is a graphical depiction of a time/temperature schedule of gas injection.

The injection of the low temperature gas continues until a steady state flow rate is established. FIG. 11 illustrates a gas temperature schedule believed to be effective in accomplishing the in situ decontamination of the zone 12. Reference numeral 170 shows the steady state injection achieved after the liquid water is substantially removed from the soil 12.

After removal of liquid water, the burner 49 is fired to increase the temperature of the injected gases 14. The procedure for the hot gas injection operation varies, depending upon the type and water content of the contaminated soil. The temperature and pressure of the injected gas 14 is regulated to prevent the formation of condensation ahead of the hot gas front so that the soil formation does not become flooded or water logged, thereby reducing the permeation of the soil and the flow of hot gases therethrough. The hot gases 14 are injected into the contaminated zone by slowly raising the pressure at the bottom of the injection wells. The temperature increase can be at a steady rate, or increased incrementally in predefined steps, as shown by reference numeral 172 of the graph. The hot injected gases 14 displace the remaining liquid water occluded in the pore spaces adjacent to the injection well borehole until the gas can be transmitted from the well bore into the contaminated zone. As heat is applied, some of the initially occluded water evaporates into the air steam, gradually opening the pores, thereby increasing the flow of injection gases 14.

As noted above, when a steady state rate has been achieved at a satisfactorily high gas flow, the temperature of the gas 14 is slowly raised to evaporate additional water from the soil. For illustration purposes, it is believed that a temperature rise of 20° F. every 2–3 hours will be effective to achieve contaminant vaporization without vapor condensation and resultant flooding. As the temperature rise is being carried out, the air stream picks up what moisture it can hold at the particular injection temperature, until the injected gas 14 becomes saturated with water vapor. The gas initially injected into this soil becomes saturated and flows outwardly to cooler zones, whereupon some of the water vapor condenses, so that the air is saturated at the lower temperature of the cooler zone. Preferably, the desire is to raise the temperature of the injection gases 14 very gradually during the early periods when a substantial amount of water is present in the soil pores, such that the recondensation occurring ahead of the heated front is limited to a level that will not completely fill the pores and thus flood the soil. As can be appreciated, such flooding restricts the passage of injected gases 14 and thus limits the rate at which the soil can be further heated. The regulation of temperature and pressure of the heated gas 14 contrasts with the steam injection technique, in that the steam provides the bulk of its heat by condensing and thus maintains the soil ahead of the heated zone in a flooded state.

If, indeed, soil flooding should occur ahead of the heated zone, due to having raised the gas temperature too rapidly, an increase in the injection pressure at a constant gas flow rate can be noticed. Alternatively, when employing a constant injection pressure, a sudden reduction in the flow rate can be detected. When the temperature of the soil is raised to rapidly, too much water may be evaporated in the heated front which could result in increased condensation in the cooler zone immediately downstream therefrom. The increased condensation has the effect of filling the soil pores, thus resulting either in diminished flow or increased pressure, or both. It is thus highly advantageous to monitor the condition of flooding by observing either the flow rate or the gas injection pressure. In the event that condensation of water in the heated front results in a flooded condition, the gas injection temperature can be held constant, and the pressure can be gradually increased to displace the excess liquid in the formation ahead of the flooded zone. Such a procedure is continued until the air flow is reestablished at a desired rate. The gas flow rate and pressure can be regulated by the appropriate controls of the compressor 18.

As the temperature of the soil formation is increased, the contained water is decreased, thereby enabling the gas injection temperature and flow to both be increased. When substantially all of the water has been evaporated in the contaminated soil, which is around 212° F., the injection temperature can be increased toward a maximum amount. Depending on the soil type and consistency, it is expected that generally the soil temperature can be increased about 200° F. per day, thereby raising the soil temperature to about 800° F. in 4–5 days. The flow rate of the heated soil is then limited only by the resistance of the open soil pores, in the absence of water therebetween, or by the gas injection equipment.

It follows that one skilled in the art can utilize this pore flooding phenomenon for useful purposes. For example, it is desirable that the flow of heated gas occurs uniformly from the points of injection at the base of the contaminated zone to the surface, where the vent gases containing removed contaminants can be collected for disposal. Due principally to lack of uniformity in porosity of the soil in the contaminated zone, both laterally and vertically, some non-uniformity of gas flow can be expected. This can be observed by monitoring the temperature profile developed in the contaminated zone by the thermocouples 52 disposed in the contaminated zone 12. In most instances, this non-uniformity can be tolerated and accommodated by continuing the air flow until all the contaminated zone is swept of contaminants. In the case where the non-uniformity results in uneven channelling of the air, such that some zones are not adequately swept, it is desirable to be able to impede the channelling to some extent, so that greater uniformity of sweep is achieved. This may be accomplished by intentionally irrigating or flooding with water the zone where more air is channeled, thus restricting flow. This may be carried out by the selective and controlled addition of water by the irrigation system 57 into the path of channelling. In most cases, this would be done by wetting down the surface over the area where it is desired to reduce flow.

A soil temperature of about 500° F. is sufficient to remove 400° F. end point gasoline which is one predominant soil contaminant. Due to the energy required to raise the soil temperature this amount, some extended heating may be required, to the extent of two to three weeks. In addition, a quick elevation of the soil temperature could cause severe cracking and the resulting failure of complete permeation of the soil, due to escape of the gas through such cracks or fissures. Relatively less volatile compounds can be removed at higher temperatures, and involatile compounds can be oxidized at higher temperatures, such as 800° F. It has been experimentally found that the soil structure remains stable at temperatures up to 800° F. where humus is oxidized completely in about two hours. By carrying out the progressive increases in the temperature of the contaminated soil 12, substantially all hydrocarbon contaminants can be removed. With the foregoing, those skilled in the art can readily devise of other pressure and temperature schedules for removing other types of contaminants.

While the various flow rates and pressures are required to be adjusted according to the type of soil and contaminants, the parameters identified herein were adapted for experimental soils having 99% sand, reddish in color, angular and of a texture, from very fine to fine. Such soil is subrounded, 1% muscovite and plagioclase. The soil grains tended to be cemented by iron oxide.

After achieving a stabilized injection operation in an actual field test program, a flow rate of about 1000 scf/hr was achieved after seven hours of operation. After several days of operation, an air balloon reached the surface and numerous percolations developed out to a surface radius approximately equal to the depth of the injection well. Preferably, the hot gas injection is carried out at a slow rate and low pressure to reduce the risk of premature breakthrough or fracture of the crust. After several days of hot gas injection, the process stabilized with a steady injection rate of about 2000 scf/hr and a pressure of about 12 psig.

After all of the contaminants have been removed from the soil, the burner 49 can be shut off, but the compressor 18 and the suction blower 44 can continue to operate to provide a circulation of cooler gases through the decontaminated soil. This is especially advantageous as the soil temperature can be restored to sufficiently low values. Unless the decontaminated soil is cooled to a lower temperature, it could remain hot for an extended period of time, due to the insulating properties of soil. As noted above, moisture, by way of a mist injector 51, can be injected downstream of the air compressor 18 or the heater-incinerator 20 in a controlled manner with the cool air to restore the water removed during the decontamination process.

While the foregoing discloses the in situ soil decontamination process by the injection of air and combustion gases, other gases can be injected to improve decontamination, depending upon the soil, temperature, type of decontaminant, etc. For example, oxygen, nitrogen and carbon dioxide are readily available types of gases which can be heated and injected into the soil. In addition, the air or gases can be dehumidified before being injected into the contaminated area.

It is also contemplated that the invention may be readily adapted to reduce the viscosity of surface and subsurface hydrocarbon tars, heavy oils and oil sands by raising the ground temperature to a level which will cause the hydrocarbon substances to transform from a solid to a liquid phase. A system of collection wells can then be employed to pump the liquid hydrocarbons from the affected area. The process can be further used for near surface mining of certain mineral compounds and complexes. Certain gold, silver, mercury, molybdenum and platinum compounds, or other certain nitrates, sulfides, phosphates and bromides are amenable to extraction by the apparatus and methods described above. The vapors are confined and captured at the surface by a hood or vapor barrier and collected appropriately. The method can be utilized for increasing soil permeability over specified areas to enhance the transmissibility, drainage and discharge of fluids or gases in subsurface media. Also, frozen ground can be thawed to allow easier access to existing subsurface installations, or to allow easier access for new construction of subsurface facilities or installations. Frozen fluids and slurries can be thawed in underground pipelines by employing the method of the invention to reestablish a fluid flow in such pipelines. The method can also be utilized for removing moisture from the soil over specific area patterns to create constant thermal conductivity in the soil for engineering or scientific investigations or applications. Also, the method can be employed to maintain soil at a constant elevated temperature to provide a stabilized environment for engineering or scientific investigations or applications, or to stimulate the growth of certain microbial cultures. In that vein, the method can be employed to prolong the growing season of specified plants or biocultures in colder climates. Also, the method can be employed for uniformly distributing moisture into dry soils for agriculture or engineering purposes by the injection of air and moisture into the subsoil.

A technical advantage of the invention, as described above, is that a burner heats a pressurized air stream, and combines the combustion gases with the air stream for injection into wells drilled in the contaminated zone. The injected gas is heated in excess of 212° F. to temperatures sufficient to vaporize volatile and less volatile contaminants, as well as to oxidize other nonvolatile contaminants. A further technical advantage of the invention is that the injected hot gases rise upwardly through the soil, due to a vertical pressure differential between the surface and the bottom of the pressurized wellbores. The rising action of the hot gases also facilitates the removal of the vaporized contaminates at the surface, without the need of extraction wells. An additional advantage of the invention is the ability to direct the hot gases in a predefined pattern so that energy can be utilized efficiently in the contaminated zone to vaporize contaminants. Yet another advantage of the invention is that energy can be conserved by utilizing a burner-incinerator assembly which employs a single burner to heat the injection gases and to incinerate the vaporized contaminants. Other advantages of the invention are apparent to those skilled in the art.

The foregoing describes techniques in which air or gas is heated by primary combustion surface equipment to the appropriate temperature. Such gases are then conveyed to the injection wells by insulated pipes. There are various limitations which limit the temperature by which air or gases can be heated and conveyed to remote locations for injection into the ground. For example, at gas temperatures above 1500° F., the surface pipes must be made of thicker sidewalls, and of different materials which are capable of withstanding such temperatures. Hence, the surface distribution of hot gases above 1500° F. becomes more expensive, and thus the decontamination process becomes less cost effective. The techniques set forth below permit the generation of gas temperatures in the neighborhood of 1200° F.–4500° F., while yet remaining cost effect.

FIG. 12 illustrates a cross-sectional view of an injection well and associated apparatus for increasing the downhole temperature of gases before lateral injection of the same into the contaminated formation. According to this technique, a wellbore 200 is formed in the contaminated formation 202 to a suitable depth. Preferably, the wellbore 200 is drilled with the diameter of about 6 inches–8 inches. The bottom six foot, or so, of the wellbore 200 is then filled with small pebbles 204, such as the well-known pea gravel or other nondecomposable material capable of functioning as a heat ballast. Other aggregate of a 1/8–1/4 inch size may be suitable, so long as it is of the type which does not melt or fuse, together at temperatures in excess of about 3500° F. Next, a casing 206 with a cement basket 208 attached at the lower end thereof is lowered into the wellbore 200. The open bottom of the casing 206, as well as the cement basket 208 rest atop the bed of pebbles 204. The casing 206 can be of a conventional type, having a diameter of about 2 7/8 inches. The annulus of the wellbore is then filled with a cement 210 of the type which can withstand the increased temperatures. As noted above, the cement basket 208 prevents the cement 210 from falling into the pebbles 204. The cement 210 is then allowed to set, thereby fixing the casing 206 centrally within the wellbore 200.

A supply of a liquid fuel for secondary combustion purposes is provided to a downhole location, and preferably within the pebbles 204, by a fuel line 212. The fuel line may have a 1/4 inch inside diameter, and be constructed of a 316 stainless steel tubing. This fuel line diameter is believed to be of sufficient size to provide a flow rate sufficient to achieve the temperatures required to vaporize and oxidize various contaminants. While the fuel line 212 can be fastened internal to the casing 206, it can otherwise be suspended centrally within the casing 206. The end 214 of the fuel line 212 is an open ended length of ceramic tubing 215 to allow a full release of the fuel into the pebbles 204. The ceramic fuel distributor 215 can withstand the high temperatures generated by the secondary combustion of the fuel fed downhole. In order to provide a more uniform distribution of fuel within the pebbles 204, an end length of the ceramic fuel line 212 can be perforated, with the end thereof capped. The ceramic distributor 215 can be fastened by conventional techniques to the end of the fuel line 212.

In order to locate the end 214 of the ceramic fuel distributor 215 within the pebbles 204, the following procedure can be carried out. When installing the fuel line 212 within the casing 206 and into the pebbles 204, a pressurized air line can be connected to the surface end 216 of the fuel line 212 by apparatus not shown. By forcing air out of the end 214 of the ceramic fuel distributor 215, the fuel line can be manually rotated and wiggled so that the ceramic end 214 works itself well into the pebbles 204. By employing air pressure in the line, small pebbles are prevented from plugging the end 214 of the fuel distributor 215.

When the fuel line end 214 is suitably located within the pebbles 204, the wellbore 200 is capped with a wellhead 218. The wellhead 218 can be of the type having various fixturing, including a pipe 28 for admitting preheated air into the casing 206. Also, the wellhead 218 includes a cap 222 to which the top end of the fuel line 212 can be attached to provide a seal to the fuel line 212. Temperature measuring equipment 224 may also be provided to monitor the temperature of the pebbles at the well bottom. Radiation pyrometers for this purpose are commercially available. The temperature measuring equipment 224 can be connected to a control system 226 to regulate the flow of fuel into the fuel line 212. The control system 226 is shown connected to a fuel line valve 228. While not shown, a source of fuel, either a gas or a liquid, can be connected to the surface fuel line 230.

According to the structure set forth in FIG. 12, the heated air which is injected into the casing 206 can be further heated by the provision of supplying fuel at the downhole location. The temperature of the air forced into the top of the casing 206 via the pipe 28 is preferably at about 1200° F., but with the addition of fuel and the resulting heat of combustion in the area of the pebbles 204, the temperature of the preheated air can be increased in the range of 1200° F.–4500° F. depending upon the type and amount of fuel utilized. In the preferred form of the invention, it is contemplated that gases, including natural gas, propane, butane, etc., can be utilized as the fuel, as such fuels are characterized by a clean burn. However, other gases can be utilized, as well as liquid fuels such as fuel oil and diesel can be injected at the downhole location.

It is contemplated that a number of injection wells, such as the type shown in FIG. 12, will be formed in the contaminated zone to provide wide area decontamination coverage. The injection wells may be spaced apart in a network at distances of about 15 feet. Again, temperature monitoring probes can be inserted into the ground at suitable depths to monitor the temperature of the contaminated formation.

After the requisite number of injection wells have been constructed, preheated air is injected therein, according to a schedule described above for initially purging the formation of water, and in a manner to prevent excessive condensation of soil moisture. After the initial heating steps have been carried out, the temperature of the preheated air forced into the wellhead pipe 28 is increased to about 1200° F. The equipment described above can be utilized for producing such a source of pressurized and preheated air. The preheated air is forced into the casing 206 at a pressure of about 7–20 psig. The preheated air is forced into the casing 206 for a time sufficient to heat the pebbles 204 to a temperature for igniting the type of fuel supplied to the surface fuel line 230. A pebble temperature of 1200° F.–1500° F. is generally sufficient to ignite most hydrocarbon fuels. After the pebbles 204 have been heated sufficiently, the supply of fuel is allowed to flow into the fuel line 212 where it exits in the area of the pebbles 204. The fuel then ignites to provide a hot combustion gas for further heating the pebbles 204 to a higher temperature. Depending upon the type of fuel, and the fuel flow in the line 212, downhole temperatures ranging upwardly of 4500° F. can be achieved. The constant source of pressurized preheated air supplied to the wellhead pipe 28 forces the yet hotter downhole gases laterally into the contaminated formation 202. The hot gases permeate the formation and vaporize and/or oxidize the contaminants in the manner described above.

Under steady state conditions, the downhole temperature of the gases can be mathematically calculated, based upon the temperature of the preheated air forced down the casing 206, the type of fuel, and the fuel flow. After a steady state temperature condition has been reached, the fuel flow can be regulated by the control system 226. Also, the combustion of the fuel provided at the downhole location can be adequately supported by the oxygen in the pressurized preheated air forced into the casing 206. The pebbles 204 function somewhat as a heat sink to thereby provide a rapid and constant heating of the fuel as it exits the bottom 214 of the ceramic fuel distributor 215.

A significant advantage of the downhole heating of gases and air by a secondary combustion is that expensive surface equipment can be eliminated. Further, with an increased air temperature forced into the contaminated formation 202, organic compounds, such as polychlorinated biphenyls (PCBs) can be oxidatively destroyed. PCBs are of very low volatility and are resistant to oxidation at lower temperatures. Soil temperatures in the range of 800° F.–850° F. are achievable by utilizing this technique to oxidize many organic and inorganic contaminants. Moreover, even if these high soil temperatures are not desired, the present technique can be utilized to heat the soil more quickly to achieve a stable temperature. Indeed, many hours and days of soil heating by primary combustion techniques can be saved, which otherwise would be required to heat the soil to the requisite steady state temperature. In this latter case, a smaller volume of heated air can be supplied to the casing 206, thereby further reducing the volume requirements of air compressing equipment. While the present technique is described in terms of maintaining a 1200° F. supply of preheated air to the casing 206, those skilled in the art may find that after the fuel has been sufficiently heated to ignite at a downhole location, such combustion can provide sufficient heat that the surface burner 49 can be deenergized. As noted above, the temperature of the air from the compressor is then about 300° F. which provides the necessary pressurized air and oxygen supply for the downhole fuel combustion, thereby further realizing system efficiency.

FIG. 13 illustrates another technique for providing a secondary combustion fuel at a downhole location to increase the temperature of the air or gas injected into the contaminated formation 202. The injection well according to this technique is similar to that described above in connection with FIG. 12, in that the casing 206, the cement basket 208 and the annulus cement 210 are formed in a similar manner. However, no pebbles are provided at the bottom of the borehole 200, but rather a solid combustion fuel 240 fills such area. The solid fuel 240 may be a coke, coal, charcoal or other suitable solid fuel. The solid fuel 240 can be initially loaded at the downhole location before the fixing of the casing 206 therein, or subsequent thereto. In other words, after the casing 206 is fixed in the wellbore 200 by the cement 210, the solid fuel can be manually fed down the casing 206 until it fills the bottom of the wellbore 200. A sufficient volume of the wellbore can be filled with the solid fuel 240 to provide the requisite energy for increasing the temperature of the preheated air forced into the wellhead pipe 220. Those skilled in the art can readily calculate the heat energy required to decontaminate the soil, and therefrom the amount of solid fuel to be burned to provide such energy.

The wellhead 242 may be fabricated to seal the top of the casing 206, provide a source of heated air to the casing by way of the pipe 28, as well as provide attachment to a slide chute 244 for holding a reserve supply 248 of the solid fuel. Fixed between the top of the wellhead 242 and the slide chute 244 is a slide valve 246 which can either manually or hydraulically operated. The slide valve 246 can be opened to allow the reserve solid fuel 248 to fall down the casing 206 to restore spent fuel. In this embodiment, an excess of the solid fuel 240 would remain at the bottom of the wellbore 200, and thus a temperature controller for controlling the rate of fuel flow is not required. However, during burning of the solid fuel 240 it may advantageous to periodically add the reserve solid fuel 248 by actuation of the slide valve 246, and the temperature of the hot gases forced in the formation can be maintained constant. Depending upon the type of solid fuel utilized, the 1200° F. preheated air forced into the casing 206 can be increased at the downhole location to about 3800° F. Again, once the solid fuel 240 is ignited by the temperature of the preheated air forced into the casing 206, the temperature of the preheated air can be lowered to about 500° F., under which condition, the exit temperature of the gases forced into the formation 202 would remain at about 3200° F. For a six inch diameter wellbore 200, and with a ten feet column of solid fuel 240 at the bottom of the borehole 200, it is envisioned that an initial charge of coke or coal would last about 24 hours. However, and as noted above, it would be preferable to recharge the depleted solid fuel 240 at periodic intervals, such as every six hours.

Figure 14:
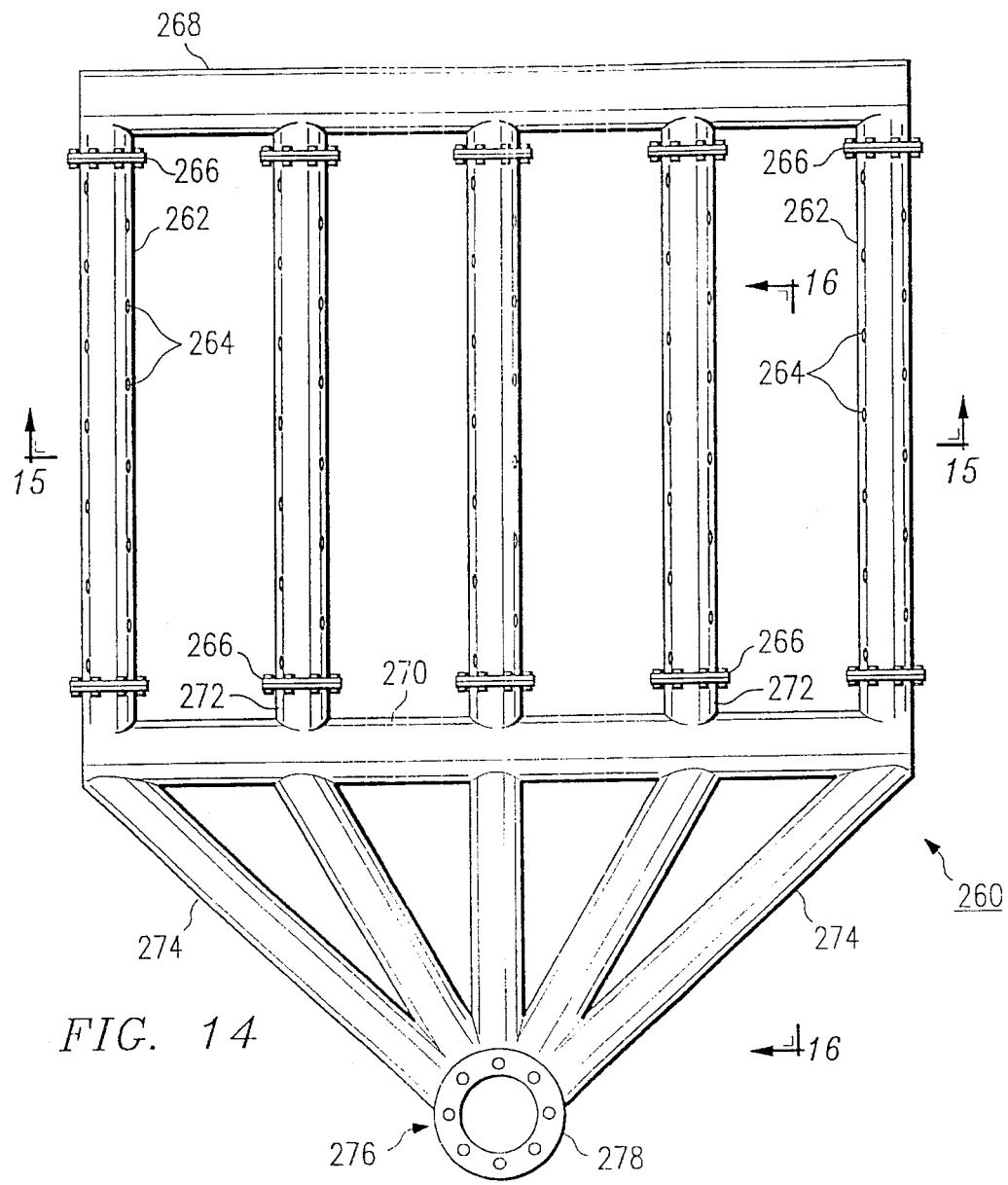
FIG. 14 is a top view of a subsurface pipe network through which heated air flows to treat excavated contaminated earth material.
Figure 15:
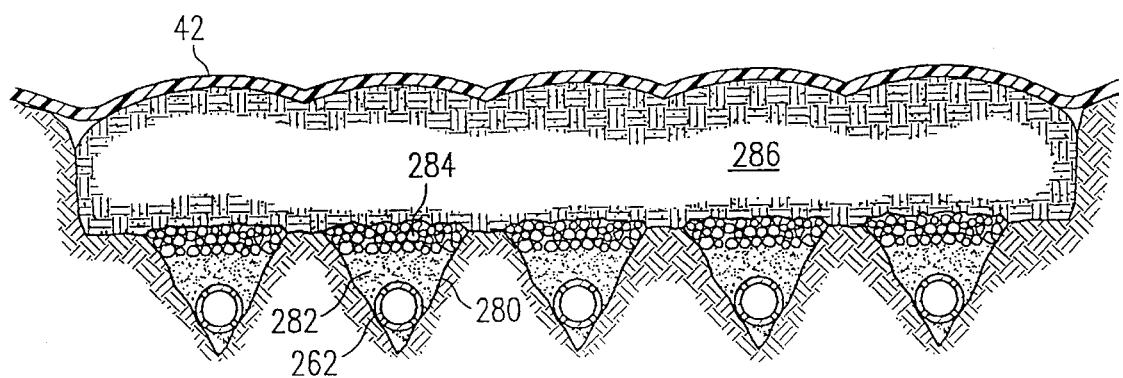
FIGS. 15 and 16 are respective cross-sectional views of the subsurface pipe network of FIG. 14, taken along lines 15—15 and 16—16 of FIG. 14.
Figure 16:
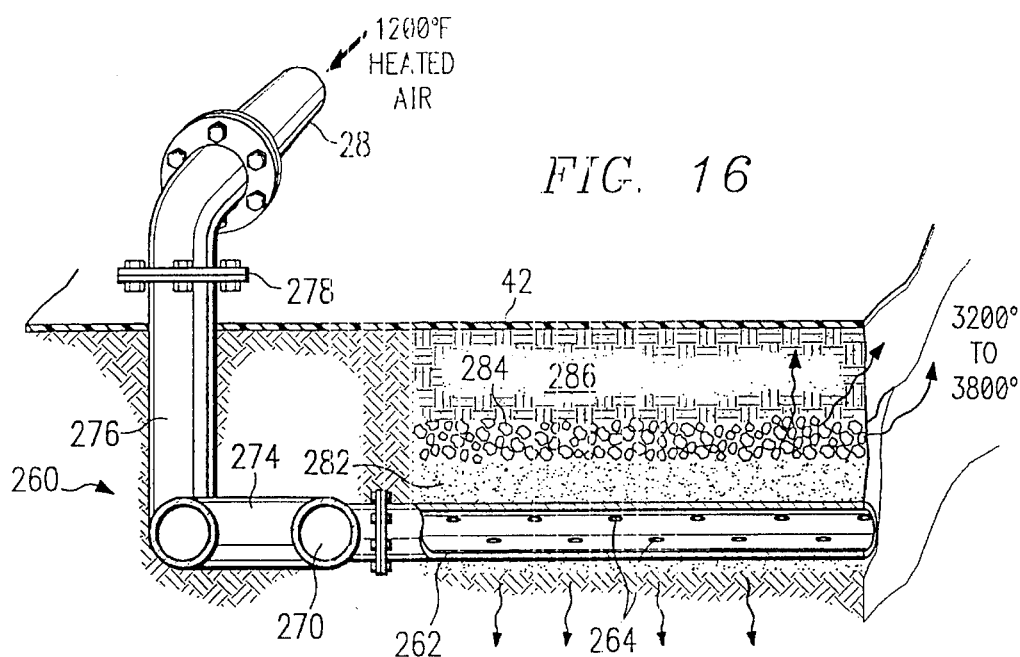

FIGS. 14–16 illustrate yet another embodiment for disposing a solid fuel at a subsurface location to further increase the temperature of a preheated gas or air which is supplied to the fuel. Such a technique is well suited for use with horizontal conduits or tubing disposed throughout the contaminated zone.

A portable and reusable tubular network or matrix 260 is employed for decontaminated excavated soil or earth material. Decontaminated earth material arising from surface petroleum spills or leaks can be excavated to a depth sufficient to remove the contaminated material. The tubular matrix 260 is then installed at the bottom of the excavated depression and covered with an insulating material, a secondary fuel, and then the excavated and contaminated soil. Energy derived from a heated gas and a secondary combustion of a subsurface fuel is utilized to vaporize contaminants from the earth material.

The tubular network 260 includes a number of sections which can be assembled and disassembled for purposes of portability from one location to another. The same network 260 can be employed in a series of operations to provide wide area decontaminating coverage. Alternatively, a number of such tubular networks 260 can be installed at the same time in a large contaminated and excavated area and operated simultaneously to decontaminate the earth material at one time. The tubular network 260 includes a number of generally parallel laterals 262, each of which includes a number of perforations 264 therearound to allow dispersion of the hot air forced therein. Each tubular lateral 262 is constructed of a high grade stainless steel or carbon steel pipe to withstand the temperature to which it is subjected. The tubular laterals 262 are preferably about 2½ inches in diameter and spaced apart from each other about 5 feet. The length of the perforated pipes 262 and the number of such pipes utilized depends on the area of coverage desired, as well as the volume and pressure of heated air supplied thereto. The ends of the laterals 262 terminate in respective flanges 266 for connection to transverse tubular manifolds 268 and 270. The transverse manifolds 268 and 270 each include spaced apart flanged tubular stubs 272 for connected to the flanged ends of the perforated lateral pipes 262. The transverse tubular manifolds 268 and 270 are each about 4½ inches in diameter to provide equalization of heated air forced into and circulated through the perforated lateral pipes 262. With this construction, the pressure of heated air forced into the perforated lateral pipes 262 is generally equal, thereby providing uniformed dispersion of the heated gas from the perforations 264 and into the surrounding material. A number of hot air distribution pipes 274 branch from a central inlet 276 to the transverse manifold 270. The respective ends of the distribution pipes 274 tend to be aligned with the lateral pipes 262. The central inlet 276 includes a flanged part 278 for connection to surface pipes which deliver the high temperature air to the grid network.

FIG. 15 shows the tubular grid network 260 of FIG. 14 installed in a trench structure for decontaminating excavated soil disposed thereover. The perforated laterals 262 are each disposed in a V-shaped trench 280 which can be easily formed by motor driven plows, or the like. Of course, the transverse manifolds 268 and 270, as well as the distributor pipes 274 would be buried in similar trenches. The trench structure 280 is formed in an excavated area, e.g., an area in which the overlying contaminated soil has been temporarily removed. Ideally, the trench structure is formed in the same shape as the grid network 260, and then the tubular network is laid at the bottom of the trenches. When installed at the bottom of the trenches 280, the entire tubular grid network is covered with an insulating layer 282 of sand, dirt or other earth material. Overlaid on the insulating material 282 is a layer of solid fuel 284, comprising charcoal or other solid fuel. The insulating material 282 prevents the high temperatures of the ignited solid fuel 284 from melting or otherwise deteriorating the grid network 260.

Once the grid network 260 has been appropriately installed in the trench structures, with the insulating material and the solid fuel overlying the perforated pipes 262, the previously excavated and contaminated soil 286 is pushed or otherwise moved into a location overlying the grid network 260. Air or gas heated to a temperature of about 1200° F. can be supplied by way of the surface pipes 28 and other connections or fittings, to the inlet 276 of the grid network 260. The heated air is distributed through the distribution tubes 274 and the transverse manifold 270 to the perforated lateral pipes 262. The heated air exits the perforations 264 and is directed generally upwardly through the insulating material 282 to the overlying solid fuel 284. After a period of heating, the solid fuel reaches a combustion temperature and ignites. The ignition of the solid fuel 284 gives rise to the generation of substantial additional heat which rises through the excavated contaminated soil 286. The contaminants are either vaporized or oxidized and collected under the vapor barrier 42. While not shown, vapor collection apparatus similar to that shown in FIG. 4 can be utilized for attachment with respect to the vapor barrier 42 for withdrawing the contaminated vapors and carrying the same to disposal equipment.

Figure 17A:
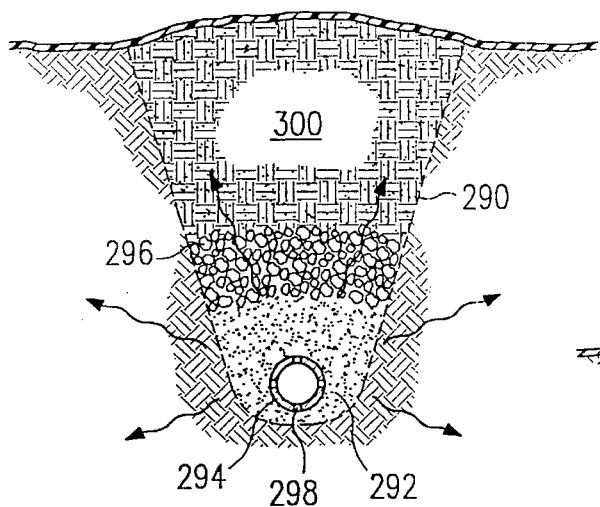
FIGS. 17a and 17b are partial sectional views of trench structures for carrying hot gases and for burning a solid fuel to increase the temperature of the gases injected into the surrounding contaminated soil.

According to another embodiment shown in FIG. 17a, a matrix, or a number of radial trenches are formed either in or at the bottom of the contaminated zone. It is contemplated that with utilization of this technique, it will be especially adapted for decontaminating excavated soils from the surface to a depth of about ten feet. In any event, a trench 290 is formed at the bottom of the zone to be decontaminated. The trench 290 can be of suitable width, such as two feet. A perforated pipe 294 adapted for carrying the heated air is laid on the floor of the trench 290, and covered with an insulating material 292. The insulating material 292 may be sand, soil or sized gravel. In this manner, the insulating material 292 completely covers the perforated pipe 294 to a dimension of about 6–12 inches. The insulating material 292 is preferably of the type which will not fuse at 1200° F.—the temperature of the air which is forced out of the perforated pipe 294. The insulating material should also be adapted for allowing a substantial flow of the heated air outwardly therethrough. Then, a layer of solid fuel, such as coke, coal or charcoal 296 is deposited on top of the insulating material 292.

The pipe 294, having perforations 298, is then connected to surface piping 28 which carries the 1200° F. preheated air. The pipe 294 can be of three inch diameter, constructed of steel or stainless steel. In order to provide sufficient exit of the preheated air from the subsurface pipe 294, the perforations 298 are of about ¼ inch diameter, spaced apart about 36 inches. The spacing and diameter of the perforations depend on the area being treated and available air flow.

After the insulating material 292 has been completely covered with the solid fuel 296, the trench can be covered with the excavated contaminated soil, such as shown by reference character 300. Lastly, the impervious layer 42 of material is placed over the surface to prevent contaminated vapors from escaping into the atmosphere.

Once the horizontal trench structures, pipe and subsurface solid fuel have been distributed throughout the contaminated zone, the surface equipment is activated to force 700° F.–1200° F. preheated air through the delivery pipes 28. The preheated air is generated by the primary combustion of fuel of surface burner/heater equipment. Such preheated air is forced through the horizontal subsurface pipes 294 and exits through the apertures 298. The preheated air exiting the subsurface apertured pipes 294 is effective to heat the solid fuel 296 above the pipe 294 to a temperature sufficient for ignition. It is expected that it will take about 12 hours for the solid fuel 296 to be heated sufficiently to ignite. Thereafter, the solid fuel 296 overlying the subsurface pipe 294 produces a sufficient secondary self-combustion to raise the temperature of the air forced into the contaminated formation to about 3200° F.–3800° F. Such final temperature is a function of the temperature of the preheated air forced into the subsurface pipe structure, as well as the type of solid fuel utilized. Based upon fuel/energy considerations, a charge of solid fuel can be loaded in the trench 290 to produce a desired soil temperature rise for a desired length of time. As can be appreciated, the high temperature air forced out of the subsurface pipe 294 disperses generally outwardly and upwardly, thereby volatilizing or oxidizing the contaminated soil in the vicinity of the pipe 294. After decontamination has been completed, the subsurface pipe 294 can either remain buried, or can be removed.

Figure 17B:
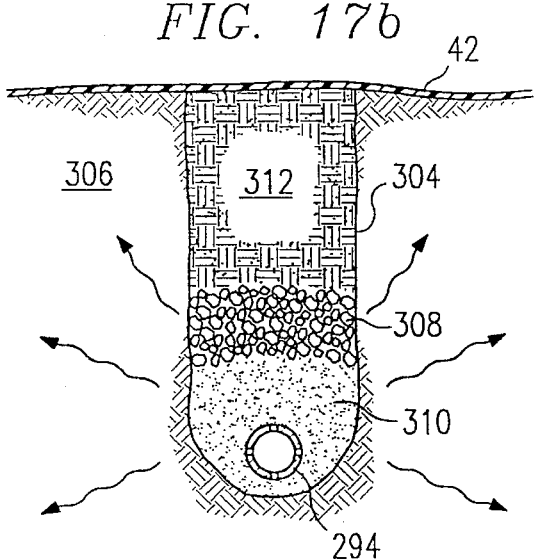

FIG. 17*b* discloses a preferred embodiment of a trench structure for use with a subsurface-disposed fuel to facilitate heating of the surrounding contaminated earth material. Advantageously, the trench structure shown in FIG. 17*b* can be utilized for the in situ decontamination of material, without substantially excavating the contaminated material. Shown is a trench 304 formed about 8 feet deep within the contaminated material 306, and about 4 inches wide. Laid within the bottom of the trench 304 is an apertured pipe 294 coupled at one end thereof to a source of pressurized and heated gas. The terminal end of the pipe 294 can be capped, thereby allowing the pressurized and heated air to escape through the apertures in the pipe 294. One or more such apertured pipes 294 can be connected together so as to be fed by a common source of pressurized and heated air. As noted above, a heated gas of a temperature upwardly of about 1200° F. is suitable for vaporizing contaminants in the earth material, as well as igniting a subsurface fuel, such as shown by numeral 308.

In installing the apertured pipe 294 within the trench 304, such pipe is covered with a layer of insulating material 310 such as soil or sand, or other thermal insulating material. Again, the insulating material 310 should overlie the apertured pipe 294 with a sufficient depth so as to prevent the heat generated by the fuel 308 from damaging the pipe 294. Once the insulating material 310 is in place, the fuel 308, preferably in a solid form, and of the type described above, is filled in over the insulating material 310. Sufficient fuel can be placed in the trench 304 to generate the desired amount of heat for a requisite amount of time to vaporize the contaminants in the surrounding soil.

In accordance with an important feature of the invention, the trench is then filled with a finely ground heat sealing material 312, such as limestone. The finely ground limestone 312 exhibits a low permeability to air, and thus to heat generated by the solid fuel 308. In addition, the limestone sealant 312 does not provide a thermal path for the heat generated by the fuel 308 in an upward direction, thereby forcing the heat generated by the solid fuel 308 to be dissipated outwardly. It has been found that by covering the solid fuel 308 with a sealant material 312, the lateral area influenced by the subsurface-generated heat is increased. As a result, the lateral area in which decontamination occurs due to vaporization of the contaminants is also increased by the provision of the sealant layer 312.

In practice, the layer of sealing material 312 comprises a 200 mesh ground limestone material. During installation of the sealing layer 312, the finely ground limestone is tamped or otherwise compressed so as to provide a low permeability to air or gas therethrough. In addition, the sealing material 312 can be wetted with various salt solutions to decrease the porosity of the sealing material 312. Various salt solutions, including calcium chloride, or sodium chloride, or sodium silicate, and water can be used to wet the sealing material 312 as successive layers thereof are installed in the trench 304. Once the water evaporates, the remaining salts crystallize and fill in the pore spaces within the sealing material 312, thereby reducing the permeability thereof. It is believed that other finely divided materials can function as the sealing material 312, including phosphate rock, bauxite, kaolinite, bentonite, and similar natural clays. As with other embodiments described above, a heated gas or air can be forced through the apertured pipe 294 to ignite the fuel 308 and increase the temperature of the contaminated formation. Once the subsurface fuel 308 is ignited, the heated air which permeates the contaminated formation 308 accelerates the vaporization of contaminants so that the overall contamination procedure is enhanced. In addition, low volatility contaminants can be removed from the formation due to the increased formation temperature resulting from the energy given off by the fuel 308.

In all of the embodiments described above in which a fuel is provided at a subsurface location to increase the temperature of the air, a vapor recovery system, such as that described above, can be utilized.

Figure 18:
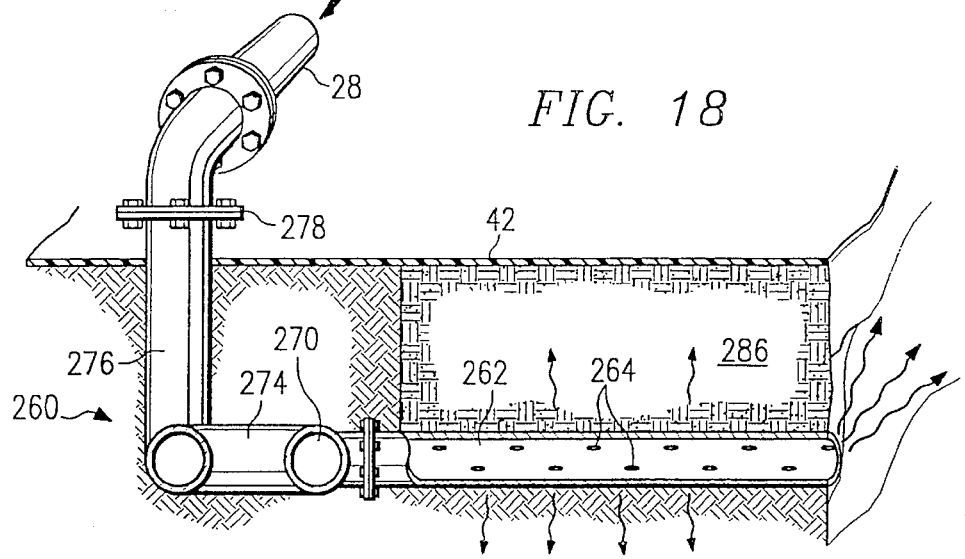
FIG. 18 is a sectional view of the trench structure and a buried apertured pipe adapted for carrying and dispersing heated air to provide energy to decontaminate overlying contaminated material.

The horizontally situated aperture pipes have been described above in connection with the use of a solid fuel for providing additional energy to vaporize contaminants. However, the use of a subsurface fuel is not absolutely necessary in order to provide decontamination capabilities. FIG. 18 illustrates the decontamination apparatus of FIG. 16, but without the use of a subsurface solid fuel. Here, the heated gas forced into the surface aperture pipes 262 is effective itself to provide the medium for vaporizing the contaminants in the overlying earth material. Also, because there is no subsurface fuel, the insulating layer is also not required. Singular apertured pipes, or a connected grid of such pipes can be laid on the floor of an excavated site, or in trenches formed in the excavated floor site. The contaminated earth material is then pushed back over the apertured pipes 262. Next, the apertured pipes 262 are connected to a source of heated air so that the air is forced out through the aperture of the pipe 262 and into the contaminated material overlying the pipes. Air heated upwardly to a temperature of 1200° F. can be forced into the apertured pipes 262 and provide sufficient heat transfer to the contaminated soil 286 to vaporize the contaminants therein. Of course, a vapor barrier 42 is overlaid on the contaminated soil 286 to prevent escape of the vapors into the environment. The contaminated vapors can be collected and disposed of in a safe manner.

After decontamination of the material 286 overlying the apertured pipes 262 has been achieved, the decontaminated soil can be removed by power equipment, and other contaminated material can be deposited on and about the apertured pipes 262. In the alternative, the apertured pipes 262 can be removed from the decontaminated soil and located at another excavated site for achieving decontamination of the material located at such site. In this manner, decontamination can be accomplished in the different sites in a series manner to effectively decontaminate a large area of earth material. Depending upon the area to be decontaminated, an entire surface layer of the contaminated site can be removed and the grid structure installed on a small area of the site floor. Contaminated soil can then be pushed by motorized equipment to cover the pipes 262 for decontamination in the manner described above. After the contaminants have been removed, the soil overlying the apertured pipes 262 can be pushed to a permanent position at another area of the excavated floor. This process can continue until all of the excavated soil has been decontaminated, and the site essentially restored with the decontaminated material.

The invention is described above in terms of applications in which air or a gas is forced into casings or apertured pipes for communication thereof into the earth material. However, the movement of air through the contaminated soil can be achieved by vacuum techniques as well. U.S. Pat. No. 4,660,639 discloses apparatus and vacuum extraction techniques for the in situ removal of contaminants located in the vadose zone. Indeed, subsurface heating of the soil can be employed in conjunction with conventional vacuum extraction techniques to expedite the volatilization of contaminants and the removal thereof from the soil. FIG. 19 illustrates vacuum extraction equipment utilized in conjunction with a subsurface fuel to produce the movement of a heated gas through the contaminated material.

Shown in FIG. 19 is a vacuum recovery well 320, preferably formed within a zone of contaminated earth material 322, shown in broken line. The recovery well 320 is formed a suitable depth within the earth such that when a below-atmospheric pressure is applied to the well 320, air or gas is caused to be moved through the contaminated zone 322. Typically, vacuum extraction techniques do not move high temperature air through the soil, and thus the volatilization of the contaminants takes place over a substantial period of time, such as a number of months, or even a year. In addition, conventional vacuum extraction techniques are presently suitable for removal of only high volatility contaminants, and are ineffective to remove low volatility contaminants and solids. In accordance with conventional vacuum extraction techniques, the recovery well 320 is coupled to a source of vacuum, or a below-atmospheric pressure generating source 321, which is driven by a gasoline engine or electric motor 324. From the vacuum generator 321, the vapor contaminants extracted from the zone 322 are transferred to an incinerator, or to a condenser or charcoal absorber for recovery of the vaporized contaminants.

In accordance with the invention, one or more other wells 326 can be formed at a location in the earth formation, and filled with a fuel 328, such as coke, coal or charcoal. Preferably, the fuel-loaded wells 326 are formed at locations in the earth formation such that the contaminated zone 322 is located between the vacuum recovery well 320 and the fuel-loaded wells 326. Once the wells 326 are formed at appropriate locations with respect to the vacuum recovery well 320, an impervious layer or barrier 330 can be placed over the contaminated zone 322 and sealed to or around the vacuum extraction piping 332. The impervious material 330 is shown extending over the earth material in which the fuel-loaded wells 326 are formed, although it is not absolutely necessary that the impervious material extend outwardly to such an extent.

The impervious material 330 functions to prevent air from entering the surface of the soil over the contaminated zone 322. The impervious surface material 330 thereby extends the horizontal path of the air moved through the subsurface formation so that the air must pass in the vicinity of one or more of the fuel-loaded wells 326. The air which is caused to be moved through the earth material proximate the fuel-loaded wells 326 is heated to a temperature higher than it otherwise would be, thereby facilitating volatilization of the contaminants within the zone 322. Moreover, it is noted that the fuel-loaded wells 326 are open at the top so that air can be drawn downwardly into the wells 326 to provide an ample supply of oxygen for combustion of the solid fuel 328. The combustion byproducts generated by the burning fuel 328 are also drawn through the earth material, and through the contaminated zone 322 centrally to the vacuum recovery well 320. As can be appreciated, the impervious material 330 functions to prevent the shortcutting of air from the surface to the vacuum recovery well 320, without first passing proximate the fuel-loaded cells 326. As noted above, a substantial amount of energy can be generated by the burning of a solid fuel 328 within the wells 326. Such energy can be transferred in the form of heat to the contaminated zone 322 to facilitate the vaporization of contaminants, whether of the type characterized by high or low volatilities.

Because of the increase in temperature of the gas extracted by way of the recovery well 320, the piping connections 332 are preferably constructed of materials which can withstand the heat. The temperature of the air extracted from the contaminated zone 322, then carried by the surface piping 332, may be upwardly of about 800° F. As a result, cooling equipment 336 may be required before the air recovered from the earth formation is drawn into the vacuum pump 321. The cooling equipment 336 may comprise a cooler-condenser with circulating water functioning as the contact liquid. Sufficient energy in the form of heat can be removed from the contaminated air carried by the surface piping 332 so that the vaporized contaminants carried through the vacuum pump 321 do not exceed its operating temperature.

Figure 20:
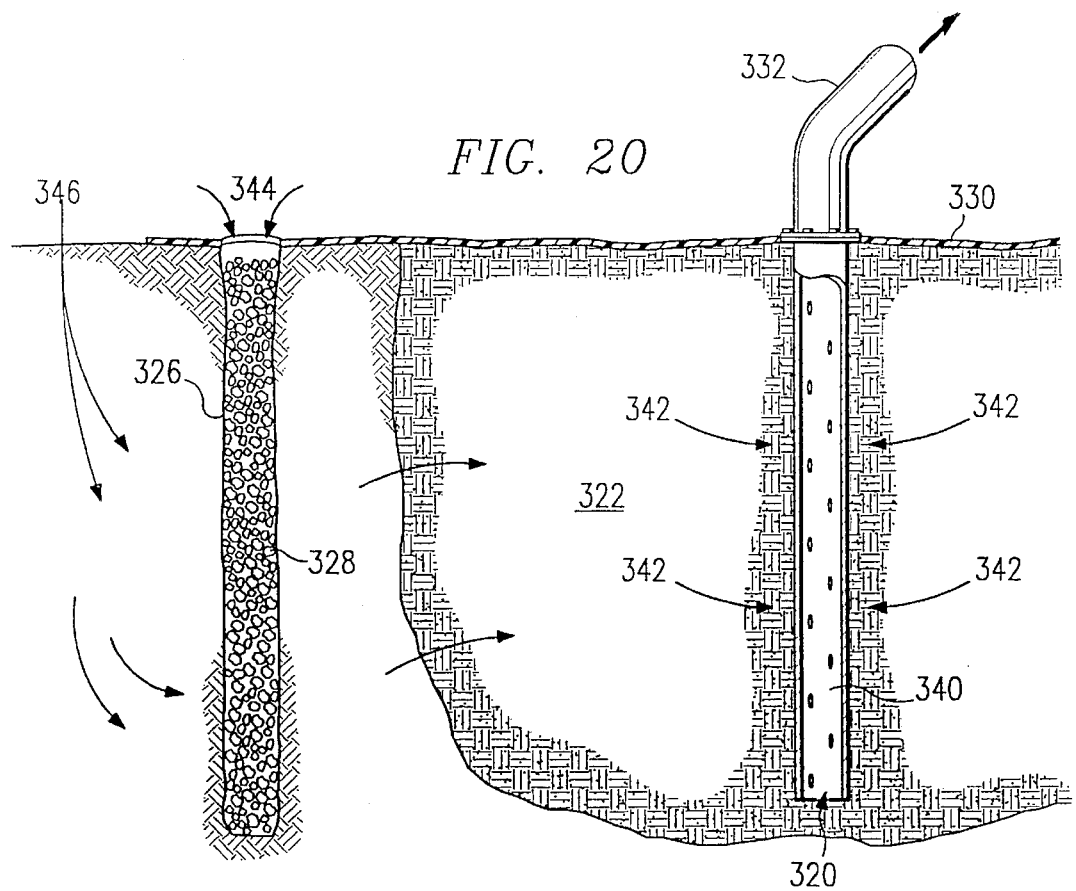
FIG. 20 is a sectional view of a portion of a contaminated zone, taken along line 20—20 of FIG. 19.

In operation of the enhanced vacuum extraction technique, reference is made to FIGS. 19 and 20. FIG. 20 illustrates the vacuum recovery well 320 having a perforated casing 340, the perforations being of sufficient number to provide an unrestricted flow of air from the surrounding contaminated zone 322 into the casing 340 by the action of a vacuum applied thereto, via the surface piping 332. The decontamination operation commences by starting the vacuum pump 321 to create a below-atmospheric pressure in the recovery well 320, via the surface piping 332. Once a flow of air has been established through the contaminated zone 322, the fuel 328 in the wells 326 is ignited by manual means, or otherwise. The fuel 328 can be ignited by saturating a top portion thereof with a liquid fuel, and igniting the liquid fuel with a flame. The solid fuel 328 will then ignite, and combustion will be sustained as fresh air is drawn into the top of the well 326 to provide the oxygen for continued combustion. Again, the impervious layer 330 or barrier material prevents air from entering the surface of the contaminated zone and bypassing the heat-generating wells 326. As the fuel 328 reaches its stabilized operating temperature, which may be as high as 3200° F., depending upon the type and amount of fuel utilized, the temperature of the air 342 moved through the contaminated zone 322 also increases. The increased temperature air 342 first vaporizes the moisture or other condensed liquids in the earth material and thereby enhances or facilitates the porosity of the earth material. With increased soil porosity, the volume of heated air moved through the contaminated zone 332 is increased, thereby reducing the overall time to remove the contaminants.

As noted in FIG. 20, atmospheric air which is drawn into the earth material byway of the surface opening to the wells 326, shown by arrows 344. A majority of air which is drawn from the atmosphere into the earth material is at a location peripheral to the barrier 330, such as shown by arrow 346. The air entrained into the soil peripheral to the barrier 330 passes proximate, or in the vicinity of the heat-generating wells 326 and therefore becomes elevated in temperature. Based upon the number of heat-generating wells employed, and the distance therebetween, the air 346 can reach a temperature of about 1500° F. as it enters the contaminated zone 322. Air temperatures of this nature are highly advantageous in removing contaminants characterized by low volatilities, as well as solid contaminants.

By utilizing bore holes formed into the earth material for holding the solid fuel 328, such fuel can be readily replenished by simply shoveling or otherwise dropping additional fuel down the well 326.

While the vertical wells 326 are contemplated as the preferred technique for use with vacuum extraction techniques, it should be understood that trench-filled solid fuels can also be utilized. The trench structures can be formed in the earth material to a depth of 5–10 feet and partially or fully filled with a solid fuel. The use of open trenches facilitates recharging with additional fuel. Once the solid fuel has been ignited, the heat generated thereby is drawn into the earth and moved toward the contaminated zone 322 under the influence of the pressure differential generated by the vacuum recovery well 320.

While the preferred and other embodiments of the invention have been disclosed with reference to specific hot gas injection apparatus and methods, it is to be understood that many changes in detail may be made as a matter of engineering choices without departing from the spirit and scope of the invention, as defined by the appended claims.

What is claimed is:

1. A method for heating an earth formation for removing contaminants therefrom and for disposing of the contaminants, comprising the steps of:

forming a bore into the earth at a location to be heated;

installing a casing in the bore;

supplying a combustible fuel in said bore so as to be disposed downstream from said casing;

communicating a continuous flow of gas down said casing and through the surrounding earth formation in a direction away from said casing and into contaminated soil;

igniting the combustible fuel to heat the gas with the heat of combustion of said fuel so that the heated gas flows through sidewalls of the bore away from the casing and through the formation to provide a continuous movement of heated gas through the contaminated soil in the formation vaporizing substantially all of the contaminants in the soil as the heated air passes therethrough;

recovering the vaporized contaminants; and disposing of the vaporized contaminants by heating the contaminants to an incinerating temperature to render the vaporized contaminants harmless.

2. The method of claim 1, further including supplying a fluid fuel via said casing.

3. The method of claim 1, further including supplying a solid fuel via said casing.

4. The method of claim 1, further including communicating the gas by forcing a preheated gas down the casing to supply oxygen for the combustion of the fuel as well as to force the heated gas into the formation and away from the casing.

5. The method of claim 1, further including communicating a preheated gas down the borehole to ignite the combustible fuel.

6. The method of claim 1, wherein the gas is communicated down said casing by pressurizing the casing.

7. The method of claim 1, wherein the gas is communicated down said casing by creating a pressure differential in the earth formation using a below atmospheric pressure, and allowing the gas to be drawn downwardly through the casing.

8. A method for heating an earth formation to remove contaminants therefrom, comprising the steps of:

forming at least one borehole in the formation to be decontaminated;

installing a casing in the borehole;

forcing a pressurized and preheated gas down the casing;

supplying a fuel down the casing;

igniting the fuel with the preheated gas to further heat the preheated gas;

forcing the heated gas out of the borehole into the formation to volatilize contaminants therein; and recovering the volatilized contaminants and incinerating the contaminants to produce harmless gasses.

9. The method of claim 8, further including supplying a fluid fuel down the casing by utilizing a fuel line different from the casing.

10. The method of claim 8, further including supplying a solid fuel by dropping the solid fuel down the casing.

11. The method of claim 8, further including regulating the fuel flow to regulate the extent of combustion and thus regulate the temperature of the heated gas forced into the formation.

12. The method of claim 8, further including preheating the gas to a temperature of about 1200° F.

13. The method of claim 8, further including heating the preheated gas with the fuel combustion to a temperature in the range of about 1200° F. to about 4500°.

14. The method of claim 8, further including heating the preheated gas with the fuel combustion to a temperature sufficient to oxidize low volatility organic compounds.

15. The method of claim 8, further including heating the preheated gas with the fuel combustion so that the contaminated formation temperature reaches a temperature in the range of about 800° F. to about 850° F.

16. Apparatus for heating an earth formation for removing contaminants therefrom, the apparatus comprising:

a bore formed into the earth at a contaminated location to be heated;

a combustible fuel supplied through said casing and disposed in a portion of the bottom of the bore that is not cased;

a burner located at a surface of the contaminated location and a compressor for preheating a gas and forcing the preheated gas down the casing; and an igniter to ignite said fuel, said preheated gas being further heated with the heat of combustion of said combustible fuel and continuously forced into the formation via sidewalls of the bore.

17. The apparatus of claim 16, further including a wellhead for capping the bore, said wellhead having an inlet for fuel and an inlet for the preheated gas.

18. The apparatus of claim 16, further including a material filling a bottom portion of the bore, said material functioning as a heat sink to store heat.

19. The apparatus of claim 18, wherein said heat sink material comprises an aggregate.

20. The apparatus of claim 18, further including a fuel line extended through said bore and into the heat sink material.

21. The apparatus of claim 16, wherein a bottom portion of the bore includes a solid fuel.

22. The apparatus of claim 16, further including:

a casing installed inside a substantial portion of said bore; and a wellhead connected to said casing, said wellhead having an inlet for the preheated gas and an inlet for dropping a solid fuel down said casing.

23. The apparatus of claim 22, further including a container fixed atop said wellhead for holding a supply of solid fuel, and a valve operable for allowing the solid fuel to drop down the casing.

24. The apparatus of claim 17, further including a supply of natural gas, and means for connecting the natural gas supply to the fuel inlet of the wellhead.

25. The apparatus of claim 24, further including a regulator for controlling the fuel flow to the fuel inlet.

26. The apparatus of claim 16, further including means for preheating a gas to about 1200° F. and injecting the preheated gas into the bore.

27. A method for removing contaminants from an earth formation, comprising the steps of:

forming a recovery well in the earth formation;

generating and applying a less-than-atmospheric pressure to the recovery well to cause a movement of air through the contaminated formation;

disposing in the earth formation a combustible fuel, said fuel being disposed in the earth formation at a location such that the contaminated formation is located between the recovery well and the fuel; and igniting the fuel to generate heat such that the air caused to be moved through the contaminated formation by the recovery well is heated by the fuel, whereby the heated air volatilizes the contaminants when moved through the contaminated formation.

28. The method of claim 27, wherein the combustible fuel is disposed in a bore formed in the earth formation.

29. The method of claim 27, further including disposing the fuel in the combustible earth formation by forming a well therein, and filling the well at least partially with a solid fuel.

30. The method of claim 27, wherein the fuel is buried in the earth formation.

31. The method of claim 27, further including forming a barrier to the movement of air on the surface of the earth formation overlying the contaminated formation.

32. The method of claim 1, further including installing a pipe down said bore and securing the pipe therein.

33. The method of claim 32, further including disposing the combustible fuel down said casing, below a bottom end of said pipe.

34. The method of claim 1, further including supplying said combustible fuel of a type that generates a temperature sufficient to destroy the casing.

35. The method of claim 1, further including preheating the gas to a temperature of about 700° F. to 1200° F., and selecting the combustible fuel to generate a temperature in the range of about 3200° F. to 3800° F.

36. The method of claim 1, further including utilizing a combustible fuel that generates temperatures in the range of about 3200° F. to 3800° F.

37. A method of heating an earth formation for removing hydrocarbon contaminants therefrom and for disposing of the contaminants, comprising the steps of:

forming a bore into the earth at a location to be heated;

installing a casing in the bore and leaving a portion of the bottom of the bore uncased;

releasing a combustible fuel in the uncased portion of the bore;

preheating a gas at the surface of the borehole to a temperature at least about 1200° F. and forcing the preheated gas down the casing;

igniting the combustible fuel with the preheated gas;

increasing the temperature of the preheated gas with the heat of combustion of the combustible fuel and forcing the increased temperature gas into the earth formation;

vaporizing hydrocarbon deposits in the earth formation with the increased temperature gas over a period of time; and recovering the vaporized hydrocarbons and incinerating the vaporized hydrocarbons to thereby produce a harmless gas.

38. The method of claim 37, further including increasing the temperature of the preheated gas to about 1500° F. when it enters the contaminated formation.

39. The method of claim 31, further including pressurizing the casing to a pressure of about 7–20 psig.

40. The method of claim 37, further including raising the temperature of the contaminated formation to about 800° F.–850° F.

41. The method of claim 37, further including releasing a solid fuel down the casing.

\* \* \* \* \*

UNITED STATES PATENT AND TRADEMARK OFFICE
CERTIFICATE OF CORRECTION

PATENT NO. : 5,482,402
DATED : January 9, 1996
INVENTOR(S) : Nelson

It is certified that error appears in the above-indentified patent and that said Letters Patent is hereby corrected as shown below:

Col. 26, line 49, delete "borehole", insert --casing--.

Col. 26, line 20, delete "combustion".

Col. 26, between lines 29 and 30, add the following paragraph --a casing installed in said bore;--

Col. 26, line 41, delete "bore", insert --casing--.

Col. 26, line 49, delete "bore", insert --casing--.

Col. 26, line 53, delete "a", insert --said--.

Col. 27, line 3, delete "bore", insert --casing--.

Col. 28, line 10, delete "releasing", insert --supplying--.

Signed and Sealed this

Eighteenth Day of November 1997

Attest:

BRUCE LEHMAN

Attesting Officer

Commissioner of Patents and Trademarks